US012587821B2

(12) United States Patent
Kim et al.

(10) Patent No.: US 12,587,821 B2
(45) Date of Patent: Mar. 24, 2026

(54) SECURE LINK ESTABLISHMENT

(71) Applicant: QUALCOMM Incorporated, San Diego, CA (US)

(72) Inventors: Hongil Kim, San Diego, CA (US); Soo Bum Lee, San Diego, CA (US); Adrian Edward Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 17/662,176

(22) Filed: May 5, 2022

(65) Prior Publication Data

US 2022/0360966 A1     Nov. 10, 2022

Related U.S. Application Data

(60) Provisional application No. 63/201,686, filed on May 7, 2021.

(51) Int. Cl.
| | |
|---|---|
| *H04W 4/00* | (2018.01) |
| *H04W 4/12* | (2009.01) |
| *H04W 8/00* | (2009.01) |
| *H04W 12/03* | (2021.01) |
| *H04W 92/18* | (2009.01) |

(52) U.S. Cl.
CPC ............. *H04W 8/005* (2013.01); *H04W 4/12* (2013.01); *H04W 12/03* (2021.01); *H04W 92/18* (2013.01)

(58) Field of Classification Search
CPC ....... H04W 8/005; H04W 4/12; H04W 12/03; H04W 92/18
See application file for complete search history.

(56) References Cited

U.S. PATENT DOCUMENTS

| | | | | |
|---|---|---|---|---|
| 10,499,236 | B2 * | 12/2019 | Stojanovski | ............ H04W 4/70 |
| 2014/0344578 | A1 * | 11/2014 | Kim | .................... H04W 12/037 |
| | | | | 713/168 |
| 2016/0302137 | A1 * | 10/2016 | Escott | ................. H04W 12/106 |
| 2016/0345169 | A1 * | 11/2016 | Wifvesson | .............. H04L 63/06 |

(Continued)

OTHER PUBLICATIONS

3GPP TR 33.833: "3rd Generation Partnership Project, Technical Specification Group Services and System Aspects, Study on Security Issues to Support Proximity Services (ProSe) (Release 13)", 3GPP Standard, Technical Report, 3GPP TR 33.833, 3rd Generation Partnership Project, Mobile Competence Centre, 650, Route Des Lucioles, F-06921 Sophia-Antipolis Cedex, France, vol. SA WG3, No. V13.0.0, Jan. 10, 2017, pp. 1-227, XP051295575.

(Continued)

*Primary Examiner* — Abdelnabi O Musa
(74) *Attorney, Agent, or Firm* — Harrity & Harrity LLP/QUALCOMM Incorporated

(57) ABSTRACT

Various aspects of the present disclosure generally relate to wireless communication. In some aspects, a first wireless communication device may receive, from a second wireless communication device, a discovery message that includes a service code. The first wireless communication device may verify the service code. The first wireless communication device may transmit, to the second wireless communication device, a connection message that includes a protected service code that is derived from the service code. Numerous other aspects are described.

55 Claims, 19 Drawing Sheets

(56)           References Cited

U.S. PATENT DOCUMENTS

| | | | | |
|---|---|---|---|---|
| 2018/0049259 A1* | 2/2018 | Aminaka | ............ | H04W 76/14 |
| 2018/0270653 A1* | 9/2018 | Wifvesson | ............ | H04W 48/16 |
| 2019/0335332 A1* | 10/2019 | Ying | ............ | H04W 40/22 |
| 2020/0178343 A1* | 6/2020 | Kim | ............ | H04W 76/27 |
| 2021/0204124 A1* | 7/2021 | Pison | ............ | H04W 12/106 |
| 2023/0254690 A1* | 8/2023 | Wang | ............ | H04W 12/0471 |
| | | | | 380/270 |
| 2023/0319549 A1* | 10/2023 | Dees | ............ | H04W 12/03 |
| | | | | 455/410 |
| 2023/0319551 A1* | 10/2023 | Kim | ............ | H04W 8/005 |
| | | | | 455/410 |
| 2023/0319915 A1* | 10/2023 | Paladugu | ............ | H04W 76/14 |
| | | | | 370/315 |
| 2024/0129746 A1* | 4/2024 | Morchon | ............ | H04W 12/0471 |

OTHER PUBLICATIONS

3GPP TS 33.303: "3rd Generation Partnership Project, Technical Specification Group Services and System Aspects, Proximity-Based Services (ProSe), Security Aspects (Release 16)", 3GPP Standard, Technical Specification, 3GPP TS 33.303, 3rd Generation Partnership Project, Mobile Competence Centre, 650, Route Des Lucioles, F-06921 Sophia-Antipolis Cedex, France, vol. SA WG3, No. V16.0.0, Jul. 10, 2020, pp. 1-90, XP051924924.

International Search Report and Written Opinion—PCT/US2022/072178—ISA/EPO—Aug. 11, 2022.

3GPP: "3rd Generation Partnership Project; Technical Specification Group Services and System Aspects, Proximity Based Services (ProSe) in the 5G System (5GS) (Release 17)", 3GPP TS 23.304 V0.2.0, Apr. 2021, 79 Pages, Sections 5.2.3 and 5.4.

3GPP: "3rd Generation Partnership Project, Technical Specification Group Services and System Aspects, Proximity-Based Services (ProSe); Security Aspects (Release 16)", 3GPP TS 33.303 V16.0.0, Jul. 2020, 90 Pages, Clause 6.1.3.2 and Clause 6.3.

3GPP: "3rd Generation Partnership Project, Technical Specification Group Services and System Aspects, Proximity-Based Services (ProSe), Stage 2 (Release 16)", 3GPP TS 23.303 V16.0.0, Jul. 2020, 130 Pages, Sections 5.3 and 5.4.4.

3GPP: "3rd Generation Partnership Project, Technical Specification Group Services and System Aspects, Study on Security Aspects of Enhancement for Proximity Based Services in the 5G System (5GS) (Release 17)", 3GPP TR 33.847 V0.5.0, Mar. 2021, 120 Pages, Clause 6.1, 6.4, 6.9, 6.10, 6.14, 6.15, 6.18, 6.19, 6.29, 6.30, 6.32, 6.35.

3GPP: "3rd Generation Partnership Project, Technical Specification Group Services and System Aspects, Study on System Enhancement for Proximity Based Services (ProSe) in the 5G System (5GS) (Release 17)", 3GPP TR 23.752 V17.0.0, Mar. 2021, Technical Report, 184 Pages, Clause 6.1, 6.6, 6.7, 6.19, 6.23, 6.27, 6.28, 6.35, 8.1, 8.3.

3GPP: "3rd Generation Partnership Project, Technical Specification Group Core Network and Terminals, Proximity-Services (ProSe) in 5G System (5GS) Protocol Aspects, Stage 3(Release 17)", 3GPP TS 24.554 V0.2.0, Apr. 2021, pp. 1-137.

* cited by examiner

600

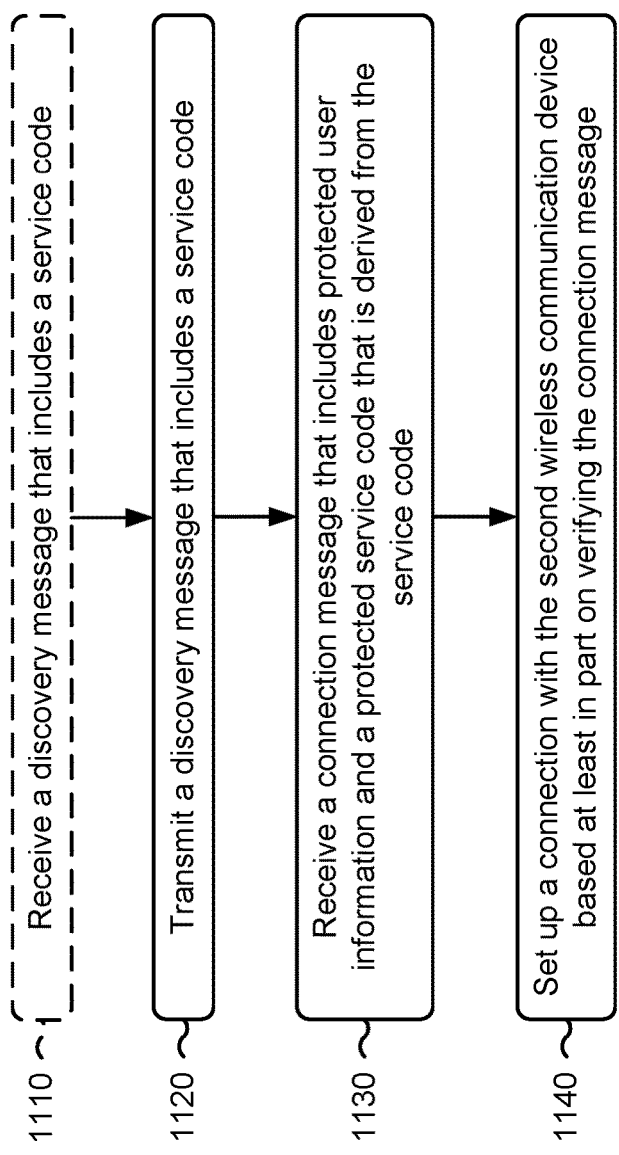

1110 — Receive a discovery message that includes a service code

1120 — Transmit a discovery message that includes a service code

1130 — Receive a connection message that includes protected user information and a protected service code that is derived from the service code 1140 — Set up a connection with the second wireless communication device based at least in part on verifying the connection message

SECURE LINK ESTABLISHMENT

CROSS-REFERENCE TO RELATED APPLICATION

This Patent Application claims priority to U.S. Provisional Patent Application No. 63/201,686, filed on May 7, 2021, entitled "SECURE LINK ESTABLISHMENT," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for establishing a link.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink and uplink. "Downlink" or "forward link" refers to the communication link from the base station to the UE, and "uplink" or "reverse link" refers to the communication link from the UE to the base station. As will be described in more detail herein, a base station may be referred to as a Node B, a gNB, an access point (AP), a radio head, a transmit receive point (TRP), a New Radio (NR) base station, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a first wireless communication device includes receiving, from a second wireless communication device, a discovery message that includes a service code. The method may include verifying the service code and transmitting, to the second wireless communication device, a connection message that includes a protected service code, the protected service code being derived from the service code.

In some aspects, a method of wireless communication performed by a first wireless communication device includes transmitting, to a second wireless communication device, a discovery message that includes a service code. The method may include receiving, from the second wireless communication device, a connection message that includes protected user information and a protected service code, the protected service code being derived from the service code. The method may include setting up a connection with the second wireless communication device based at least in part on verifying the connection message.

In some aspects, a first wireless communication device for wireless communication includes a memory and one or more processors coupled to the memory, the one or more processors configured to receive, from a second wireless communication device, a discovery message that includes a service code. The one or more processors may be configured to verify the service code and transmit, to the second wireless communication device, a connection message that includes a protected service code, the protected service code being derived from the service code.

In some aspects, a first wireless communication device for wireless communication includes a memory and one or more processors, coupled to the memory, configured to transmit, to a second wireless communication device, a discovery message that includes a service code. The one or more processors may be configured to receive, from the second wireless communication device, a connection message that includes a protected service code, the protected service code being derived from the service code. The one or more processors may be configured to set up a connection with the second wireless communication device based at least in part on verification of the connection message.

In some aspects, a non-transitory computer-readable medium storing a set of instructions for wireless communication includes one or more instructions that, when executed by one or more processors of a first wireless communication device, cause the first wireless communication device to receive, from a second wireless communication device, a discovery message that includes a service code. The instructions may cause the first wireless communication device to verify the service code and transmit, to the second wireless communication device, a connection message that includes a protected service code, the protected service code being derived from the service code.

In some aspects, a non-transitory computer-readable medium storing a set of instructions for wireless communication includes one or more instructions that, when executed by one or more processors of a first wireless communication device, cause the first wireless communication device to transmit, to a second wireless communication device, a discovery message that includes a service code. The instructions may cause the first wireless communication device to receive, from the second wireless communication device, a connection message that includes a protected service code, the protected service code being derived from the service code. The instructions may cause the first wireless communication device to set up a connection with the second wireless communication device based at least in part on verification of the connection message.

In some aspects, an apparatus for wireless communication includes means for receiving, from another apparatus, a discovery message that includes a service code. The apparatus may include means for verifying the service code and means for transmitting, to the other apparatus, a connection message that includes a protected service code, the protected service code being derived from the service code.

In some aspects, an apparatus for wireless communication includes means for transmitting, to another apparatus, a discovery message that includes a service code. The apparatus may include means for receiving, from the other apparatus, a connection message that includes a protected service code, the protected service code being derived from the service code. The apparatus may include means for setting up a connection with the other apparatus based at least in part on verification of the connection message.

In some aspects, a method of wireless communication performed by a first wireless communication device includes receiving, from a second wireless communication device, a discovery message that includes a service code. The method may include verifying the service code and transmitting, to the second wireless communication device, a connection message that includes a protected service code that is derived from the service code.

In some aspects, a method of wireless communication performed by a first wireless communication device includes transmitting, to a second wireless communication device, a discovery message that includes a service code. The method may include receiving, from the second wireless communication device, a connection message that includes a protected service code that is derived from the service code and setting up a connection with the second wireless communication device based at least in part on verifying the connection message.

In some aspects, a first wireless communication device for wireless communication includes a memory and one or more processors coupled to the memory, the one or more processors configured to receive, from a second wireless communication device, a discovery message that includes a service code. The one or more processors may be configured to verify the service code and transmit, to the second wireless communication device, a connection message that includes a protected service code that is derived from the service code.

In some aspects, a first wireless communication device for wireless communication includes a memory and one or more processors, coupled to the memory, configured to transmit, to a second wireless communication device, a discovery message that includes a service code. The one or more processors may be configured to receive, from the second wireless communication device, a connection message that includes a protected service code that is derived from the service code. The one or more processors may be configured to set up a connection with the second wireless communication device based at least in part on verifying the connection message.

In some aspects, a non-transitory computer-readable medium storing a set of instructions for wireless communication includes one or more instructions that, when executed by one or more processors of a first wireless communication device, cause the first wireless communication device to receive, from a second wireless communication device, a discovery message that includes a service code. The instructions may cause the first wireless communication device to verify the service code and transmit, to the second wireless communication device, a connection message that includes a protected service code that is derived from the service code.

In some aspects, a non-transitory computer-readable medium storing a set of instructions for wireless communication includes one or more instructions that, when executed by one or more processors of a first wireless communication device, cause the first wireless communication device to transmit, to a second wireless communication device, a discovery message that includes a service code. The instructions may cause the first wireless communication device to receive, from the second wireless communication device, a connection message that includes a protected service code that is derived from the service code. The instructions may cause the first wireless communication device to set up a connection with the second wireless communication device based at least in part on verifying the connection message.

In some aspects, an apparatus for wireless communication includes means for receiving, from another apparatus, a discovery message that includes a service code. The apparatus may include means for verifying the service code and means for transmitting, to the other apparatus, a connection message that includes a protected service code that is derived from the service code.

In some aspects, an apparatus for wireless communication includes means for transmitting, to another apparatus, a discovery message that includes a service code. The apparatus may include means for receiving, from the other apparatus, a connection message that includes a protected service code that is derived from the service code. The apparatus may include means for setting up a connection with the other apparatus based at least in part on verifying the connection message.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example process performed, for example, by a first wireless communication device, in accordance with the present disclosure.

DETAILED DESCRIPTION

Figure 1:
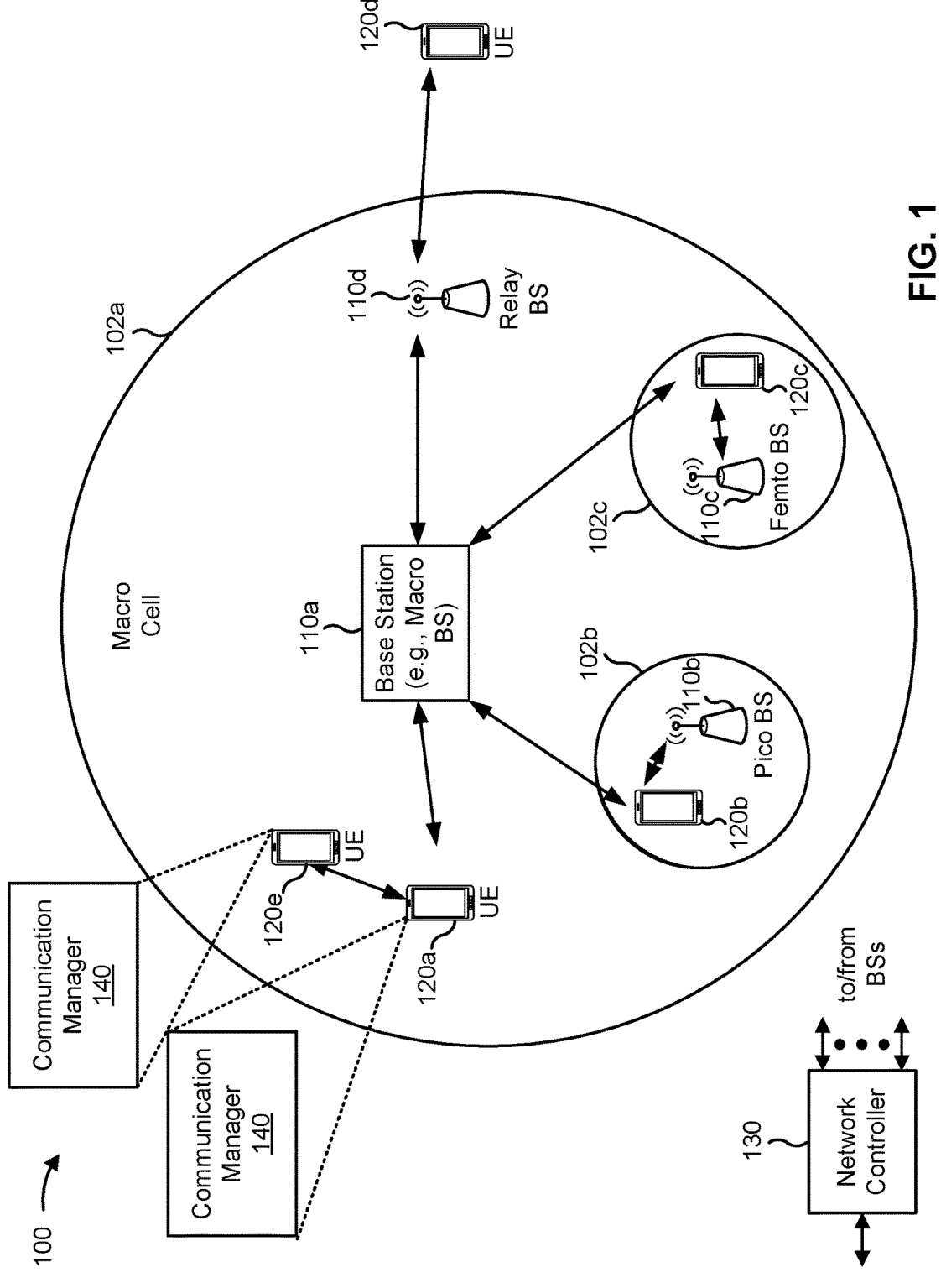
FIG. 1 is a diagram illustrating an example of a wireless network, in accordance with the present disclosure.

A first wireless communication device, such as a user equipment (UE), may use a link to directly communicate with a second wireless communication device, which may be another UE. The link may be a sidelink that uses, for example, a PC5 interface. The first device may use a discovery procedure to discover nearby devices for communication. The discovery procedure may include the first device transmitting messages that announce that the first device is able to communicate with other devices and receiving responses from one or more devices that are monitoring for such announcement messages. Proximity services (ProSe) direct discovery is an example of a discovery procedure for locating and communicating with other nearby devices, such as the second device. ProSe may give the first device a capability for direct discovery and for direct communication over an interface such as the PC5 interface. Direct discovery may include open discovery that does not require explicit permission from the device being discovered (discoveree) or restricted discovery that does require explicit permission from the device being discovered. In one example, PC5 signaling may be used for direct discovery and for setting up direct communications between devices.

Depending on the discovery procedure, the signaling between the devices may include a service code that identifies a service (e.g., relay service, location service) being provided to the first device by the second device. In the case of a relay service, the service code may be a relay service code (RSC). For example, the first device (e.g., remote UE) may receive a discovery message from the second device (e.g., relay UE). A remote UE may be a UE that does not have a direct connection to the network, and a relay UE may be a UE that relays communications between a UE and the network. The discovery message may include a service code (e.g., RSC). The first device may verify the service code. This may include checking the service code against stored information or using a filter. After discovery and verification, the devices may proceed with establishing a link for direct communication. For example, the first device may transmit a connection message, such as a direct connection request (DCR). The connection message may include the service code and some user identifying information for a user of the first device, such as a ProSe relay user key (PRUK) identifier (ID) that is used to identify the PRUK. However, in one example, while the discovery message may be protected (e.g., scrambled with a security parameter, encrypted), the service code and user identifying information for the user of the first device in the connection message are unprotected. An attacking device may sniff (read) the service code in the connection message, trace the relay service, and identify which relay service that the first device is trying to use on a link (e.g., via PC5 interface). In addition, an attacking device may sniff the user identifying information for the user of the first device in the connection message, and identify the user that is to use a particular relay service. Once this security is compromised, the attacker may obtain sensitive information that is part of the service. The devices and associated users may lose security and waste processing resources (e.g., processor time) and signaling resources (e.g., time-frequency resources) mitigating a security breach or attack.

According to various aspects described herein, the first device may, after discovery, securely establish a link for direct communication by protecting the service code in the connection message that is transmitted to the second device. In one example, the service code may be the RSC and the connection message maybe the DCR. The protected service code may be the service code that is protected by scrambling the service code or encrypting the service code. According to one example, scrambling the service code may include using a scrambling code to reorder and/or replace bits or portions of the service code such that the service code appears to be random bits. A device having the scrambling code may unscramble the scrambled service code. Encrypting the service code may include using a key or cipher to convert the service code into a code that can only be converted back to the service code with the key or cipher. A key or cipher may be a piece of information known only to certain parties. In some aspects, the service code may be protected by a code-sending security parameter or a code-receiving security parameter. A code-sending security parameter may provide the necessary information for a transmitting UE to protect a service code. A code-receiving security parameter may provide the information needed by the receiving UE to undo the protection applied to the protected service code.

The first device may also protect user information that is included in the connection message. Protected user information may be user information that is encrypted. In this way, an attacker cannot identify the relay service used by the first device or identify the second device, the user of the first device, or a user of the second device. As a result, the first device and the second device may conserve processing resources and signaling resources that would otherwise be consumed by mitigating a security breach or an attack.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G New Radio (NR) network and/or an LTE network, among other examples. The wireless network 100 may include a number of base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR base station", "gNB", "TRP", "AP", "node B", "5G NB", and "cell" may be used interchangeably herein.

In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity"

may refer to one of the base station functions and not another. In this way, a single device may include more than one base station.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some aspects, a first wireless communication device (e.g., UE 120*a*) may include a communication manager 140. As described in more detail elsewhere herein, the communication manager 140 may receive, from a second wireless communication device (e.g., UE 120*e*), a discovery message that includes a service code. The communication manager 140 may verify the service code and transmit, to the second wireless communication device, a connection message that includes a protected service code that is derived from the service code. Additionally, or alternatively, the communication manager 140 may perform one or more other operations described herein.

In some aspects, the second wireless communication device (e.g., UE 120*e*) may include a communication manager 140. As described in more detail elsewhere herein, the communication manager 140 may transmit, to the first wireless communication device (e.g., UE 120*a*), a discovery message that includes a service code. The communication manager 140 may receive, from the first wireless communication device, a connection message that includes a protected service code that is derived from the service code. The communication manager 140 may set up a connection with the first wireless communication device based at least in part on verifying the connection message. Additionally, or alternatively, the communication manager 140 may perform one or more other operations described herein.

As indicated above, FIG. 1 is provided as an example. Other examples may differ from what is described with regard to FIG. 1.

Figure 2:
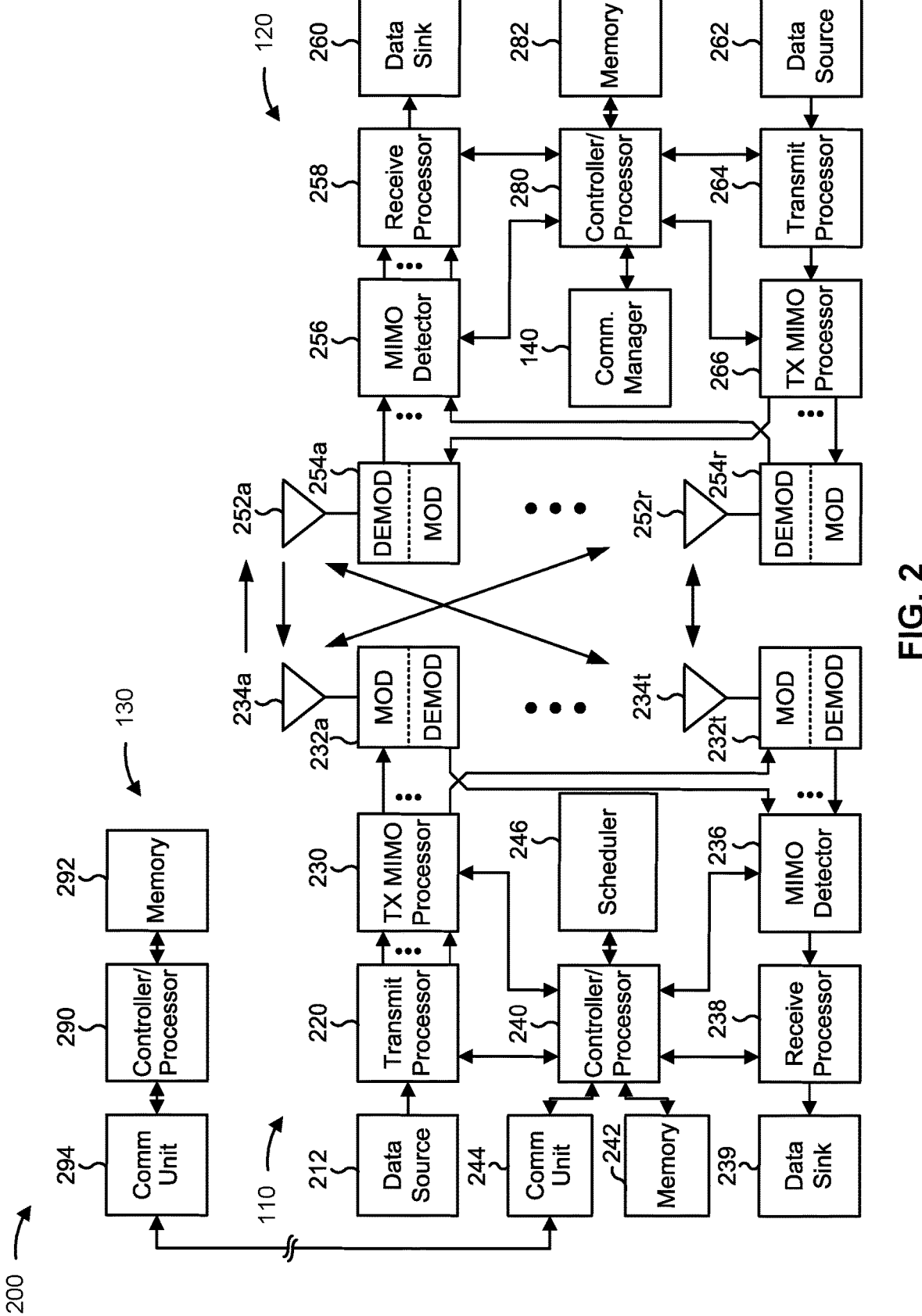
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

A controller/processor of a wireless communication device, such as a controller/processor 280 of UE 120 and/or any other component(s) of FIG. 2 may perform one or more techniques associated with securely establishing a link, as described in more detail elsewhere herein. For example, controller/processor 280 of UE 120 and/or any other component(s) of FIG. 2 may perform or direct operations of, for example, process 1000 of FIG. 10, process 1100 of FIG. 11, and/or other processes as described herein. Memory 282 may store data and program codes for UE 120. In some aspects, memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the UE 120, may cause the one or more processors and/or the UE 120 to perform or direct operations of, for example, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, a first wireless communication device (e.g., UE 120) includes means for receiving, from a second wireless communication device, a discovery message that includes a service code, means for verifying the service code, and/or means for transmitting, to the second wireless communication device, a connection message that includes a protected service code that is derived from the service code. In some aspects, the means for the first wireless communication device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In this paragraph, the second wireless communication device may be considered a first wireless communication device if the viewpoint is changed to that of the second wireless communication device. What was described as the first wireless communication device in the previous paragraph may become the second wireless communication device. Accordingly, in some aspects, a first wireless communication device (e.g., UE 120) may include means for transmitting, to a second wireless communication device, a discovery message that includes a service code, means for receiving, from the second wireless communication device, a connection message that includes a protected service code that is derived from the service code, and/or means for setting up a connection with the second wireless communication device based at least in part on verifying the connection message. In some aspects, the means for the first wireless communication device to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3A:
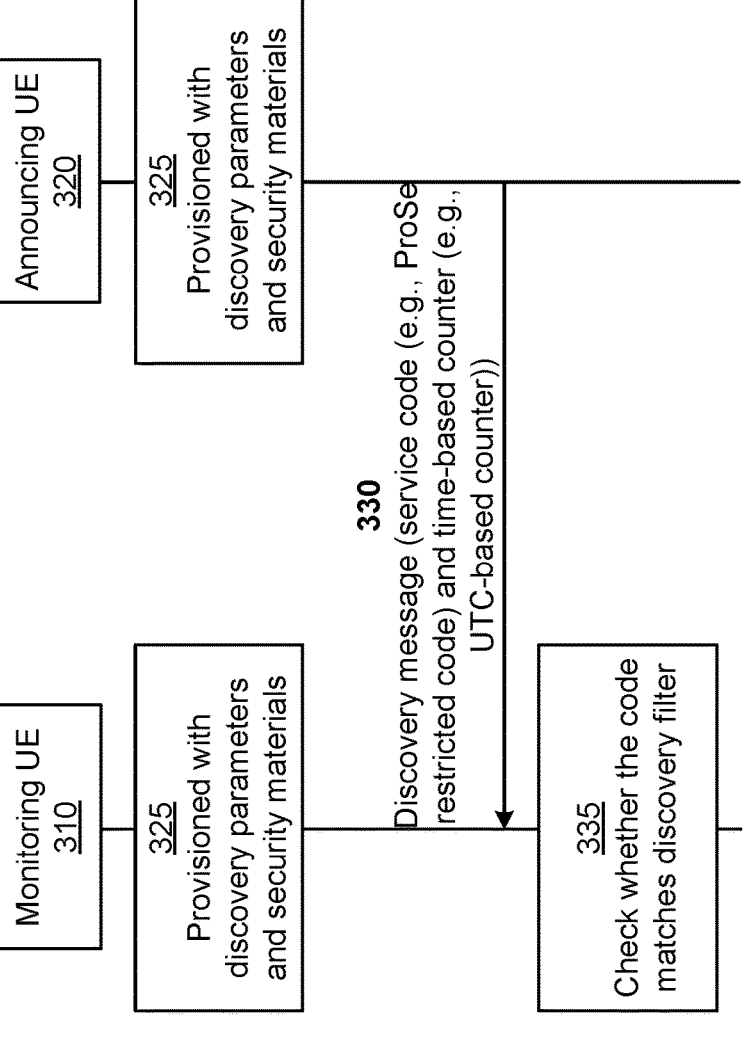
FIG. 3A is a diagram illustrating an example of a direct discovery model, in accordance with the present disclosure.

FIG. 3A is a diagram illustrating an example 300 of a direct discovery model, in accordance with the present disclosure. Example 300 shows a monitoring UE 310 (e.g., UE 120) and an announcing UE 320 (e.g., UE 120) that may communicate directly with one another.

ProSe is an example of a direct discovery signaling that may give a UE a capability for direct discovery and for direct communication over a sidelink interface, such as a PC5 interface. Direct discovery may be an open discovery that does not require explicit permission from the UE being discovered or a restricted discovery that does require explicit permission from the UE being discovered. The UE may obtain permission (or authorization) to use the restricted discovery from a network entity referred to as PKMF (ProSe Key Management Function). Once the UE is authorized, the PKMF provides corresponding discovery parameters and security materials. PC5 signaling, for example, may be used to establish one-to-one communication between UEs.

Example 300 shows a restricted direct discovery model (Model A) for example, for ProSe direct discovery, where the announcing UE 320 and the monitoring UE 310 may be provisioned with discovery parameters and security materials, as shown by reference number 325. Discovery parameters may include parameters or information that enable the UE to perform discovery (e.g., ProSe Direct discovery), such as the mapping of ProSe services to Destination Layer 2 ID, application identifiers, and a validity timer. Security materials may include parameters or information used to protect the discovery message, such as a code-sending security parameter or a code-receiving security parameter. For example, UE 320 may use a service code (e.g., ProSe restricted code) and a code-sending security parameter. The service code may be an RSC for relay services. UE 310 may use a code-receiving security parameter and a discovery filter. The discovery filter may include application codes, application masks, a current time, or a timing offset parameter. The discovery filter may be used by UE 310 to check if the service code included in the received discovery message matches with the expected service code.

UE 320 may start announcing the service code, as if to announce that "I am here." For example, as shown by reference number 330, UE 320 may transmit a discovery message. The discovery message may be a PC5 discovery message that includes a service code (e.g., ProSe restricted code), announcer information, a message integrity check (MIC), and/or a time-based counter, such as a coordinated universal time (UTC)-based counter. A MIC is used to check the integrity of the discovery message, and may further enable a UE or a network to verify that an announcing UE is indeed authorized to announce an application code at that time instance. The UTC-based counter may be used to calculate the MIC and verify the MIC. The PC5 discovery message, for example, may be protected with a code-sending security parameter, via scrambling, ciphering and/or integrity protection.

UE 310 may verify the restricted code in the discovery message. For example, UE 310 may unscramble the discovery message using the code-receiving security parameter. As shown by reference number 335, UE 310 may check whether the code (e.g., ProSe restricted code) in the discovery message matches a discovery filter. If the restricted code matches the discovery filter, UE 310 may check the MIC or perform a match report procedure, based at least in part on the configuration.

Figure 3B:
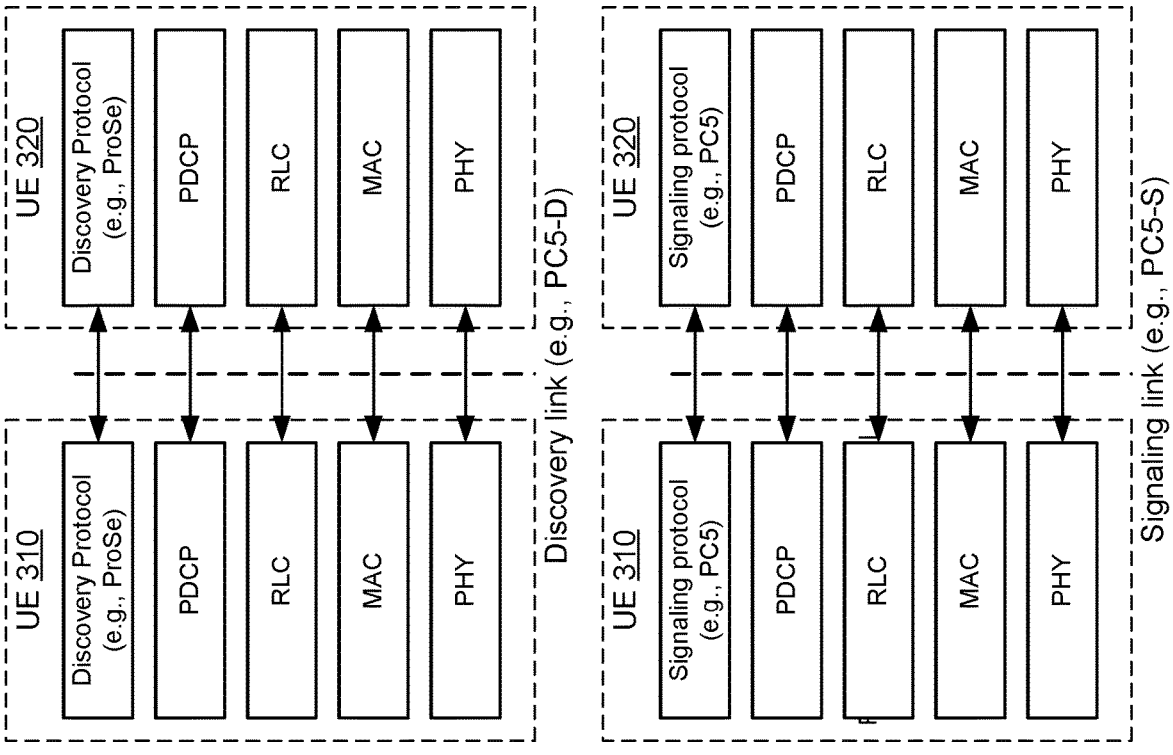
FIG. 3B is a diagram illustrating an example of a protocol stack for signaling for discovery, in accordance with the present disclosure.

FIG. 3B shows an example 302 of a protocol stack for signaling for discovery (e.g., ProSe discovery), as part of the direct discovery model shown by FIG. 3A. The protocol stack may include a physical (PHY) layer, a medium access control (MAC) layer, a radio link control (RLC) layer, a packet data convergence protocol (PDCP) layer, and a higher layer for the discovery protocols. The signaling may be over a PC5-D link. FIG. 3B also shows a protocol stack for signaling (e.g., PC5 signaling) between UEs for connection messages for establishing a link. The protocol stack may include a higher layer for signaling (e.g., PC5 signaling, including over a PC5-S link).

As indicated above, FIG. 3A and FIG. 3B are provided as examples. Other examples may differ from what is described with regard to FIG. 3A and FIG. 3B.

Figure 4:
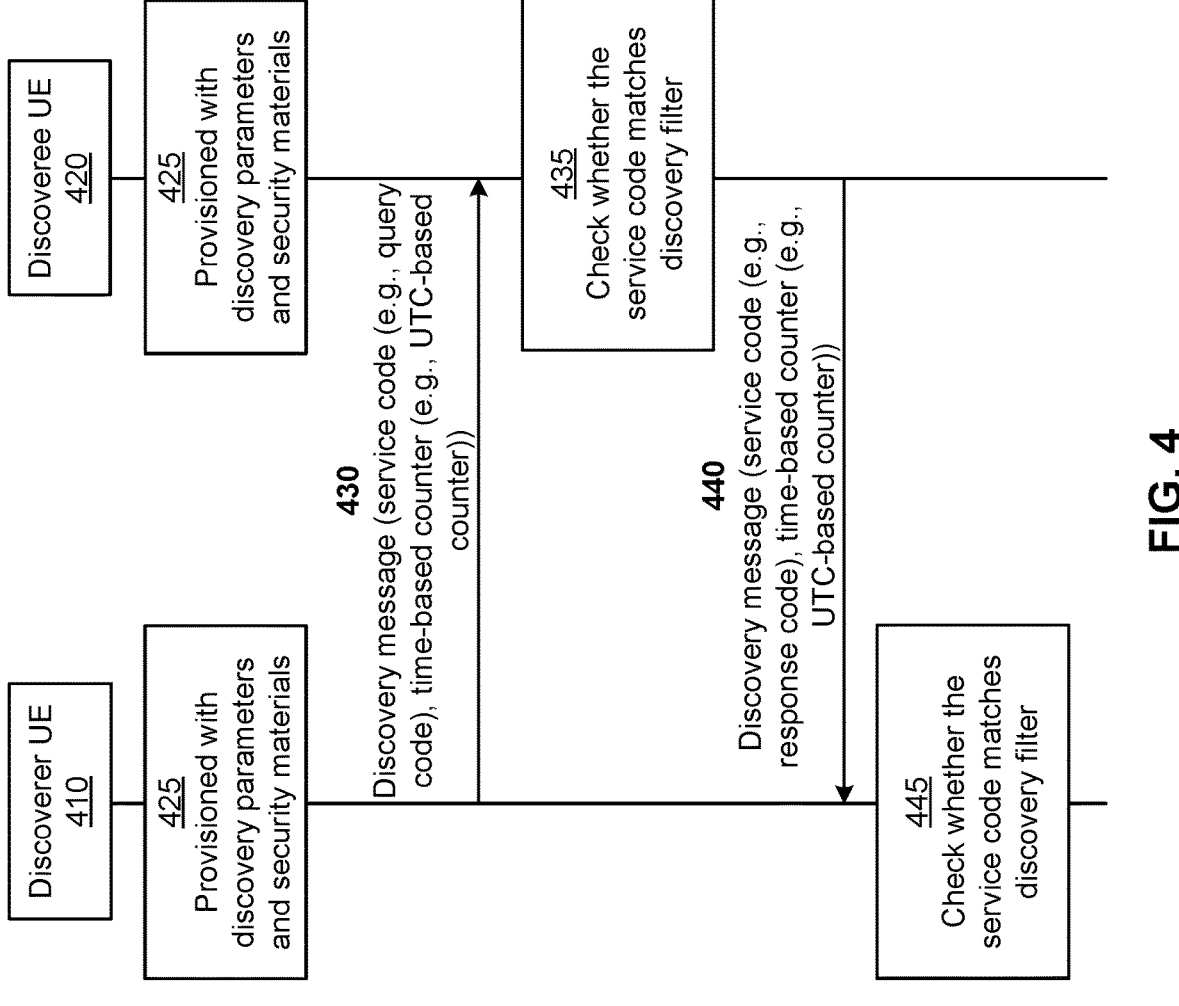
FIG. 4 is a diagram illustrating an example of a direct discovery model, in accordance with the present disclosure.

FIG. 4 is a diagram illustrating an example 400 of a direct discovery model, in accordance with the present disclosure. Example 400 shows a discoverer UE 410 and a discoveree UE 420 that may communicate directly with one another.

Example 400 shows another restricted discovery model (Model B), such as for ProSe direct discovery, that operates as if to ask, "Who is there? Are you there?" The discoverer UE 410 and the discoveree UE 420 may be provisioned with discovery parameters and security materials, as shown by reference number 425. For example, UE 410 may transmit a service code, such as a query code (e.g., ProSe query code), that is protected based on a code-sending security parameter. UE 420, on receiving the query code from UE 410, removes the protection using the code-receiving security parameters and further checks whether the received query code matches the code that UE 420 supports using a discovery query filter. If the match is successful, UE 420 may transmit a response code (e.g., ProSe response code) that is protected based on a code-sending security parameter. UE 410 removes the protection of the received response code and further checks whether the received response code matches the code UE 410 is expecting, using the discovery filter.

As shown by reference number 430, UE 420 may transmit a discovery message. The discovery message may be a PC5 discovery message that includes the query code (e.g., ProSe query code), discoverer information, an MIC, and/or a time-based counter (e.g., UTC-based counter). The PC5 discovery message may be protected with a code-sending security parameter, via scrambling and/or integrity protection.

UE 420 may verify the query code in the discovery message. For example, UE 420 may unscramble the discovery message using the code-receiving security parameter. As shown by reference number 435, UE 420 may check whether the query code in the discovery message matches a discovery query filter.

As shown by reference number 440, UE 420 may transmit a discovery message (e.g., PC5 discovery message) that includes a response code (e.g., ProSe response code), discoveree information, an MIC, and/or a time-based counter (e.g., UTC-based counter). The PC5 discovery message may be protected with a code-sending security parameter.

UE 410 may unscramble the PC5 discovery message using the code-receiving security parameter. As shown by reference number 445, UE 410 may check whether the response code is expected or matches a discovery response filter.

As indicated above, FIG. 4 is provided as an example. Other examples may differ from what is described with regard to FIG. 4.

Figure 5:
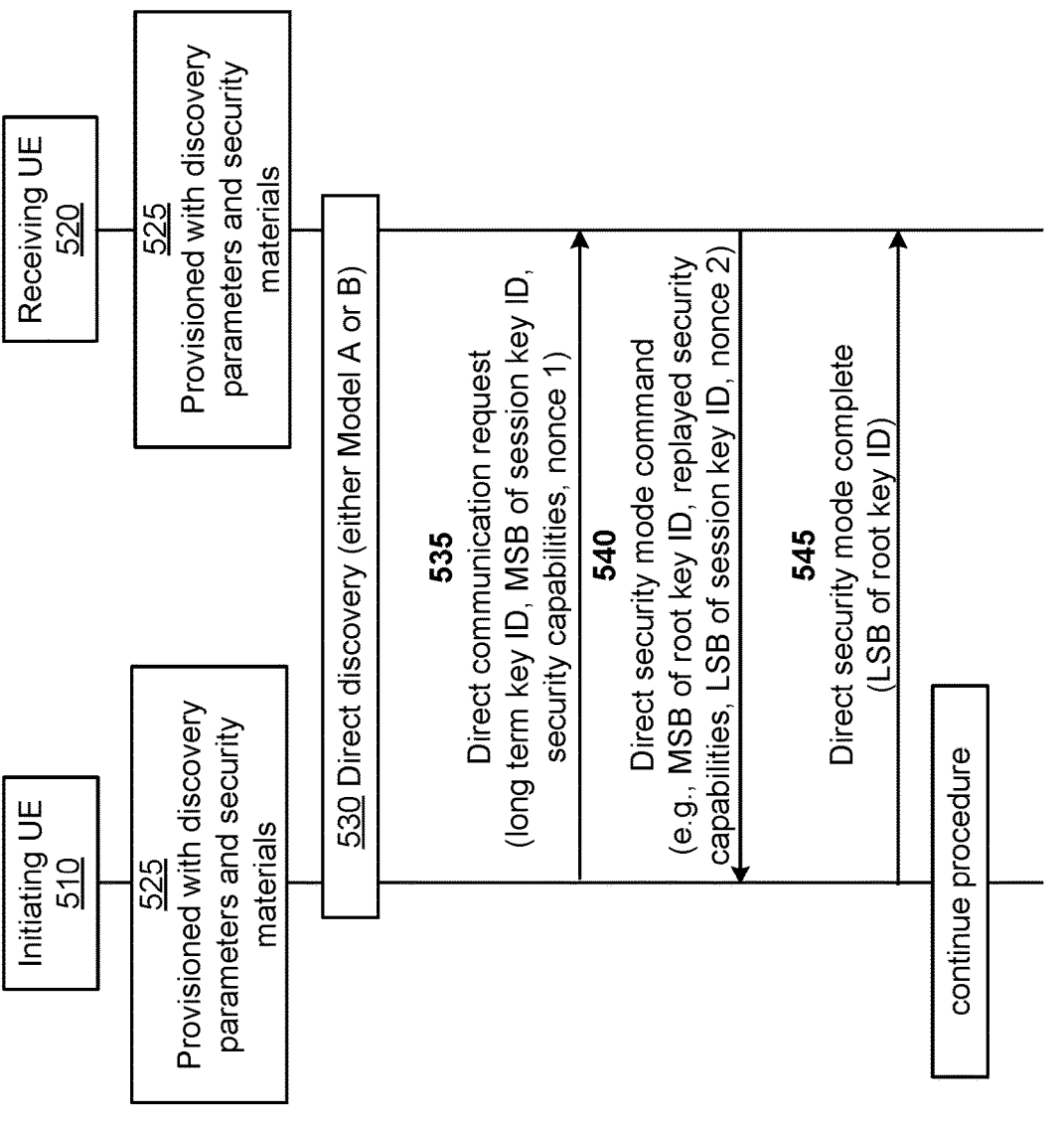
FIG. 5 is a diagram illustrating an example of link establishment, in accordance with the present disclosure.

FIG. 5 is a diagram illustrating an example 500 of link establishment, in accordance with the present disclosure. Link establishment may follow the discovery procedures described in connection with FIGS. 3 and 4. Example 500 shows an initiating UE 510 and a receiving UE 520 that may communicate directly with one another.

Example 500 shows establishing a PC5 link for one-to-one (e.g., ProSe) direct communication. UE 510 and/or UE 520 may be provisioned with discovery parameters and security materials, as shown by reference number 525. As shown by reference number 530, UE 510 and UE 520 may perform direct discovery using, for example, Model A (FIG. 3) or Model B (FIG. 4). As shown by reference number 535, UE 510 may transmit a connection message (e.g., DCR) that includes a long term key ID, a most significant bit (MSB) of a session key ID, security capabilities, and/or a first nonce. A long term key may be provisioned into the UE and may be the root of the security for one-to-one communications. The long term key may be a symmetric key or a public/private key pair depending on the particular use case. Security capabilities may indicate which security algorithms supported by the UE. A long term key and its ID may become a PRUK and PRUK ID in the case of UE-to-network relay. If necessary, UE 510 and UE 520 may perform a direct authentication and key establishment procedure.

As shown by reference number 540, UE 520 may transmit a direct security mode command to establish a session key. The direct security mode command may include replayed security capabilities, a second nonce, a least significant bit (LSB) of a session key ID, an MSB of a root key ID, and/or an indication of algorithms (e.g., Chosen_algs).

UE 510 may transmit a reply. As shown by reference number 545, UE 510 may transmit a direct security mode complete message. The direct security mode complete message may include an LSB of a root key ID. UE 510 may continue with establishing a direct connection link and communicating on the direct connection link.

As indicated above, FIG. 5 is provided as an example. Other examples may differ from what is described with regard to FIG. 5.

Figure 6:
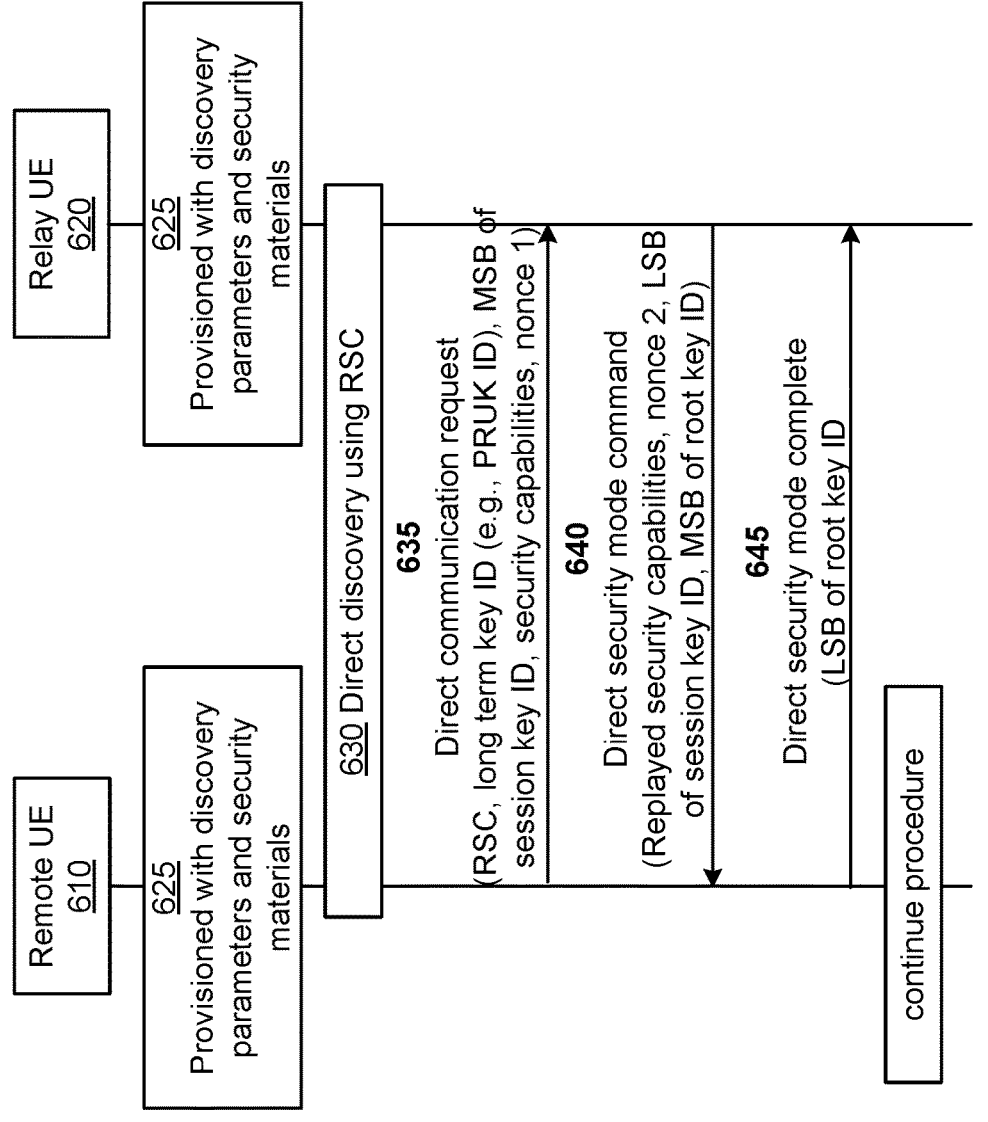
FIG. 6 is a diagram illustrating an example of link establishment for a relay, in accordance with the present disclosure.

FIG. 6 is a diagram illustrating an example 600 of link establishment for a relay, in accordance with the present disclosure. Example 600 shows a remote UE 610 and a relay UE 620 that may communicate directly with one another as part of a relay service.

Example 600, more specifically, shows establishing a link (e.g., PC5 link) for one-to-one (e.g., ProSe) direct communication as part of a UE-to-network relay. UE 610 and UE 620 may be provisioned with discovery parameters and security materials, as shown by reference number 625. The procedure shown by example 600 may be similar to example 500 shown by FIG. 5, except that the procedure shown by example 600 may include transmission of a service code, such as an RSC. Accordingly, UE 610 may transmit an RSC and use a code-receiving security parameter and/or a discovery filter. UE 620 may transmit an RSC and use a code-sending security parameter for protecting messages.

As shown by reference number 630, UE 610 and UE 620 may perform direct discovery using, for example, Model A (FIG. 3) or Model B (FIG. 4). However, in example 600, the direct discovery procedure may use the RSC. As shown by reference number 635, UE 610 may transmit a DCR that includes the RSC, a long term key ID (e.g., PRUK ID), an MSB of a session key ID, security capabilities, and/or a first nonce. If necessary, UE 610 and UE 620 may perform a direct authentication and key establishment procedure.

As shown by reference number 640, UE 620 may transmit a direct security mode command to establish a session key. The direct security mode command may include replayed security capabilities, a second nonce, an LSB of a session key ID, an MSB of a root key ID, and/or an indication of algorithms (e.g., Chosen_algs). UE 610 may transmit a reply. As shown by reference number 645, UE 610 may transmit a direct security mode complete message. The direct security mode complete message may include an LSB of a root key ID. UE 610 may continue with establishing a direct connection and communicating on the direct connection.

The discovery procedure may involve protected messages, but the link establishment is less secure. During link setup over the PC5 for relay, an initial connection message (e.g., DCR) from UE 610 may include a plain RSC. That is, while a discovery message may be protected in restricted discovery (e.g., scrambled based on the code-sending security parameter or a discovery user scrambling key (DUSK)), the RSC in the DCR may not be separately protected. An attacking device may "sniff" the RSC in the DCR, and by sniffing the RSC, the attacking device can trace which relay service UE 610 is using. Both UE 610 (service consumer) and UE 620 (service provider) can also be identified. Now that the security of the link establishment procedure has been compromised, UE 610 and 620 may consume additional processing resources and signaling resources mitigating a security breach or an attack.

As indicated above, FIG. 6 is provided as an example. Other examples may differ from what is described with regard to FIG. 6.

Figure 7:
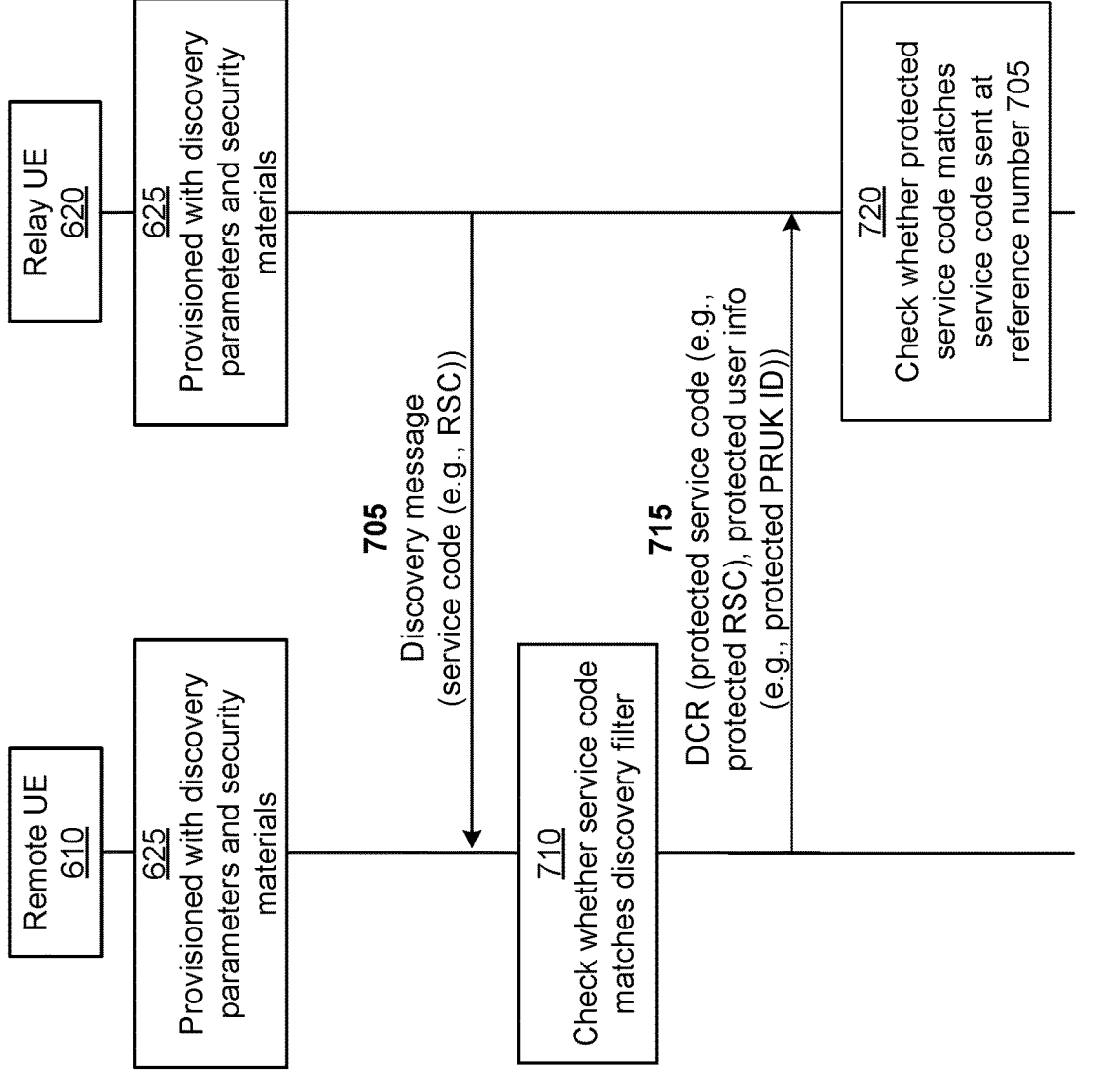
FIG. 7 is a diagram illustrating an example of secure link establishment for a relay, in accordance with the present disclosure.

FIG. 7 is a diagram illustrating an example 700 of secure link establishment for a relay, in accordance with the present disclosure. Example 700 shows the remote UE 610 (monitoring) and the relay UE 620 (announcing) that are shown in example 600 of FIG. 6.

According to various aspects described herein, UE 610 may securely establish a link for direct communication by protecting the service code (e.g., RSC) in the DCR that is transmitted to UE 620. The protected service code may be protected by scrambling the service code or encrypting the service code. UE 610 may also protect user information that is included in the DCR. The user information may include a user key identifier, such as a PRUK ID. In this way, an attacker cannot identify the relay service used by UE 610 or identify UE 620. As a result, UE 610 and UE 620 may conserve processing resources and signaling resources that would otherwise be consumed by mitigating a security breach or an attack.

Example 700 shows securely establishing a link with respect to restricted discovery Model A. UE 610 and UE 620 may be provisioned with parameters, as described in connection with reference number 625 of example 600. However, in some aspects, UE 610 may additionally use a code-sending security parameter, and UE 620 may additionally use a code-receiving security parameter. A security parameter may include a DUSK for message scrambling, a discovery user integrity key (DUIK), or an indication whether to use match reports for MIC checking for integrity protection. A security parameter may include a discovery user confidentiality key (DUCK) and a corresponding encrypted bits mask for confidentiality protection of partial message contents.

As shown by reference number 705, UE 620 may transmit a discovery message, such as a PC5 discovery message. The discovery message may include the service code (e.g., RSC), announcer information, a MIC, and a time-based counter (e.g., UTC-based counter). The discovery message may be protected with a code-sending security parameter of UE 620.

UE 610 may receive the discovery message. As shown by reference number 710, UE 610 may determine whether the RSC matches a discovery filter. If the RSC matches the discovery filter, UE 610 may transmit a DCR, as shown by reference number 715. The DCR may include a protected service code (e.g., protected RSC). The protected RSC may be derived from the RSC by scrambling the RSC or encrypting the RSC. In some aspects, if the RSC is scrambled as part of the discovery message, UE 610 may transmit the scrambled RSC in the DCR.

In some aspects, if the RSC is scrambled as part of the discovery message, UE 610 may rescramble the RSC. The RSC may be rescrambled using the code-receiving security parameter and/or other parameters (e.g., direction bit). The RSC may also be rescrambled using the code-sending security parameter. The DCR may further include protected user information that is derived from user information (e.g., user ID information, a user key ID, a PRUK ID). For example, the protected user information may be a protected PRUK ID. The protected user information may be protected by scrambling the user information with the code-sending security parameter or the code-receiving security parameter. The protected user information may be protected by encrypting the user information. The protected RSC and/or the protected user information may also be confidentially protected.

There may be other ways to include a protected service code or protected user information. In some aspects, the DCR may include at least a portion of the discovery message and/or other parameters, which may be protected using the code-sending security parameter of the UE 620. In some aspects, the DCR may include a hash of the discovery message and/or other parameters.

UE 620 may receive the DCR, unprotect the RSC, and verify the RSC. As shown by reference number 720, UE 620 may check whether the RSC that was protected (e.g., scrambled or encrypted RSC) matches the RSC that was transmitted by UE 620 in the discovery message. If there is an RSC match, UE 610 and UE 620 may proceed with establishing a direct communication link and may communicate over the direct communication link.

In some aspects, UE 620 may receive at least a portion of the discovery message in the DCR or a hash of the discovery message. UE 620 may check whether the discovery message or hash of the discovery message included in the DCR matches what was transmitted earlier by UE 620. If there is a match, UE 610 and UE 620 may proceed with establishing a direct communication link and may communicate over the direct communication link. In some aspects, a partial match may be sufficient.

As indicated above, FIG. 7 is provided as an example. Other examples may differ from what is described with regard to FIG. 7.

Figure 8:
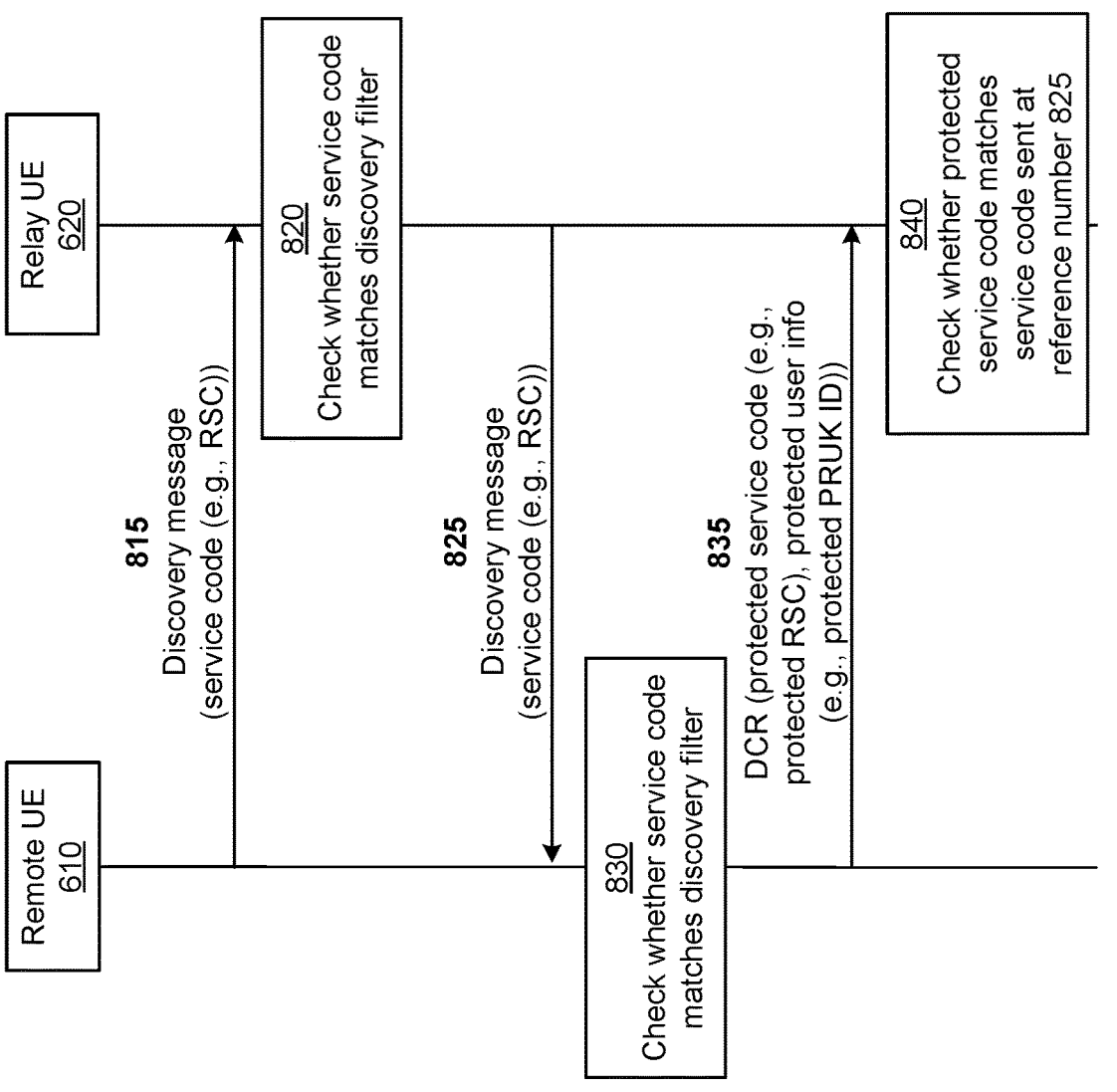
FIG. 8 is a diagram illustrating an example of secure link establishment for a relay, in accordance with the present disclosure.

FIG. 8 is a diagram illustrating an example 800 of secure link establishment for a relay, in accordance with the present disclosure. Example 800 shows the remote UE 610 (monitoring) and the relay UE 620 (announcing) from example 700 for restricted discovery Model A. Example 800 is for securely establishing a link with respect to restricted discovery Model B.

As shown by reference number 815, UE 610 may transmit an initial discovery message, such as a PC5 discovery message. The initial discovery message may include the service code (e.g., RSC), discoverer information, a MIC, and a time-based counter (e.g., UTC-based counter). The initial discovery message may be protected with a code-sending security parameter or UE 610. The code-sending security parameter of UE 610 (discoverer) may be the same as the code-receiving security parameter of UE 620 (discoveree). The code-receiving security parameter of UE 610 may be the same as the code-sending security parameter of UE 620. The code-sending security parameter and the code-receiving security parameter in one UE may be the same or may be different.

UE 620 may receive the initial discovery message. As shown by reference number 820, UE 620 may determine whether the RSC matches a discovery filter. If the RSC matches the discovery filter, as shown by reference number 825, UE 620 may transmit another discovery message, which may also be a PC5 discovery message. The discovery message may include the RSC, discoveree information, a ProSe relay UE ID, a MIC, and a UTC-based counter. The discovery message may be protected with a code-sending security parameter.

UE 610 may receive the discovery message. As shown by reference number 830, UE 610 may determine whether the RSC matches a discovery filter. If the RSC matches the discovery filter, UE 610 may transmit a connection message (e.g., DCR), as shown by reference number 835. The DCR may include a protected RSC. The protected RSC may be derived from the RSC by scrambling the RSC or encrypting the RSC. In some aspects, if the RSC is scrambled as part of the discovery message, UE 610 may transmit the scrambled RSC in the DCR.

In some aspects, if the RSC is scrambled as part of the discovery message, UE 610 may rescramble the RSC. The RSC may be rescrambled using the code-receiving security parameter and/or other parameters (e.g., message indicator). The message indicator may be used to differentiate which solution is to be used for protecting the RSC. The RSC may be rescrambled using the code-sending security parameter. The DCR may also include protected user information that is derived from user information (e.g., user ID information, a user key ID, a PRUK ID). For example, the protected user information may be a protected PRUK ID. The protected user information may be protected by scrambling the user information with the code-sending security parameter or the code-receiving security parameter. The protected user information may be protected by encrypting the user information. The protected RSC and/or the protected user information may also be confidentiality protected.

There may be other ways to include a protected service code or protected user information. In some aspects, the DCR may include at least a portion of the discovery message (from step 815 or step 825) and/or other parameters, which may be protected using the code-sending security parameter of UE 610 or of UE 620. In some aspects, the DCR may include a hash of the discovery message and/or other parameters.

In some aspects, UE 620 may receive and verify the connection message (e.g., the DCR). In some aspects, UE 620 may receive the DCR, decode or identify the RSC, and verify the RSC. Decoding the RSC may include unscrambling the protected RSC or decrypting the protected RSC. As shown by reference number 840, UE 620 may check whether the RSC that was protected (e.g., scrambled or encrypted RSC) matches the RSC that was transmitted by UE 620 in the discovery message. If there is an RSC match, UE 610 and UE 620 may proceed with establishing a direct communication link and may communicate over the direct communication link.

In some aspects, UE 620 may receive at least a portion of the discovery message in the DCR or a hash (e.g., calculated hash) of the discovery message. UE 620 may check whether the discovery message or hash of the discovery message included in the DCR matches what was transmitted earlier by UE 620.

If there is a match, UE 610 and UE 620 may proceed with establishing a direct communication link and may communicate over the direct communication link. In some aspects, a partial match may be sufficient.

Note that a difference between Model A and Model B is that, in Model B, UE 610 may have been provisioned with both code-sending and code-receiving security parameters. Therefore, UE 610 may scramble the RSC based at least in part on the code-sending security parameter. However, in model A, UE 610 may only have the code-receiving parameter in the original procedure and thus the solution may be divided into two options. The first option may include scrambling the RSC based at least in part on an existing code-receiving security parameter and an additional direction bit. The second option may include provisioning UE 610 with the code-sending security parameter (UE 620 may also be provisioned with the code-receiving security parameter) to scramble the RSC.

As indicated above, FIG. 8 is provided as an example. Other examples may differ from what is described with regard to FIG. 8.

Figure 9:
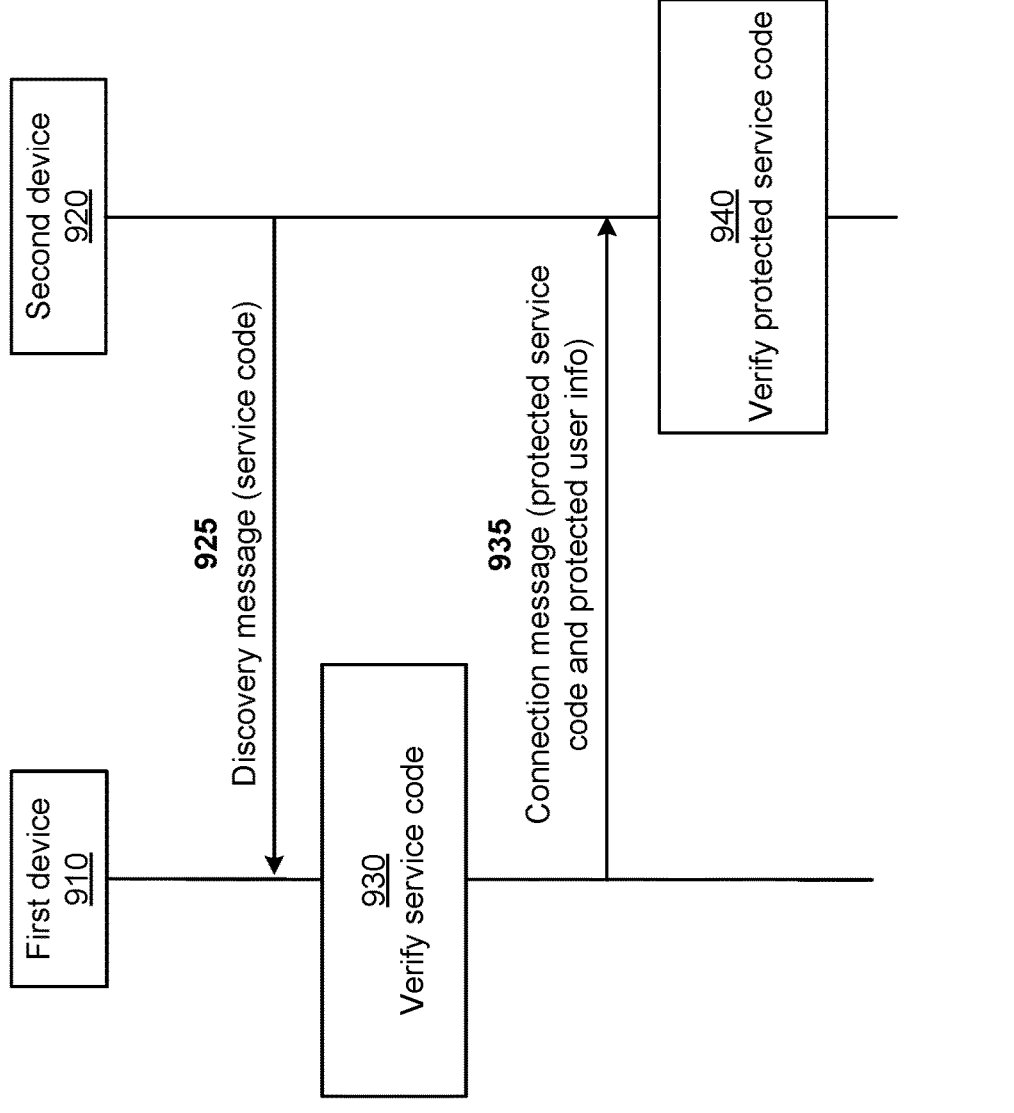
FIG. 9 is a diagram illustrating an example of secure link establishment, in accordance with the present disclosure.

FIG. 9 is a diagram illustrating an example 900 of secure link establishment, in accordance with the present disclosure. Example 900 shows a first device 910 (monitoring) and a second device 920 (announcing) that may directly communicate with one another. The first device 910 and the second device 920 may be UEs (e.g., UE 120) or may be other wireless communication devices that are to securely set up a communication link.

The first device 910 and the second device 920 may securely establish a link for communication. The link may be for direct one-to-one communication. The link may include a PC5 link or another link for direct communication. The link may be established after a discovery procedure. Example 900 shows securely establishing a link in which the discovery procedure is not limited to restricted discovery Model A or restricted discovery Model B.

As shown by reference number 925, the second device 920 may transmit a discovery message, such as a PC5 discovery message. The discovery message may include a service code (e.g., RSC) among other parameters. The discovery message may be protected.

The first device 910 may receive the discovery message. As shown by reference number 930, the first device 910 may verify the service code in the discovery message. This may include checking the service code against stored information or using a filter. If the service code is verified, the first device 910 may transmit a connection message, as shown by reference number 935. The connection message may include, among other parameters, a protected service code. The protected service code may be derived from the service code by scrambling the service code or encrypting the service code. If the service code is scrambled in the discovery message, protecting the service code may include rescrambling the service code. The service code may be rescrambled using a security parameter or key that is shared between the first device 910 and the second device 920.

In some aspects, the connection message may include protected user information that is derived from user information (e.g., user ID information, a user key ID, a PRUK ID). For example, the protected user information may be a protected PRUK ID.

There may be other ways to include a protected service code or protected user information. In some aspects, the connection message may include at least a portion of the discovery message and/or other parameters, which may be protected. In some aspects, the connection message may include a hash of the discovery message and/or other parameters.

The second device 920 may receive the connection message and verify the service code that was protected, as shown by reference number 940. The second device 920 may also verify any protected user information that was included in the connection message. If the verification is successful, the first device 910 and the second device 920 may proceed with establishing a communication link, which may be a direct communication link. By protecting service information and user information in link establishment signaling, a direct communication link may be securely established.

If open discovery is used, the PRUK ID may not be protected (e.g., by scrambling). In some aspects, the PRUK ID may be reallocated after the PRUK ID is transmitted over the air (e.g., in a DCR). The first device 910 may protect the PRUK ID.

In some aspects, one or more of the messages in example 700, example 800, and/or example 900 may include other elements as described in connection with the messages of FIG. 5 and/or FIG. 6.

As indicated above, FIG. 9 is provided as an example. Other examples may differ from what is described with regard to FIG. 9.

Figure 10:
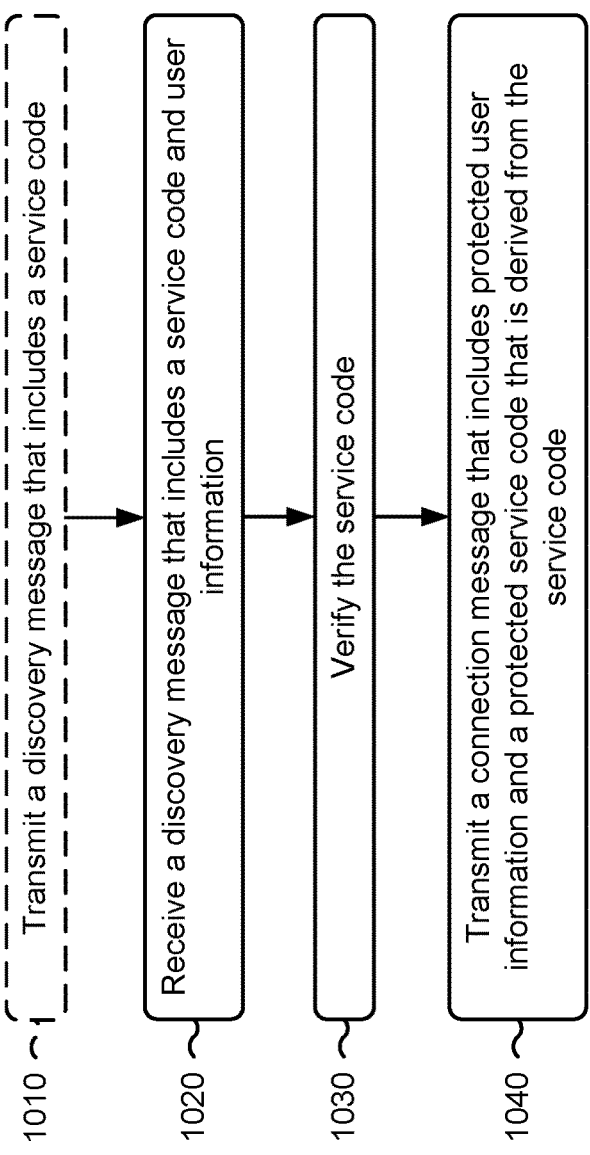
FIG. 10 is a diagram illustrating an example process performed, for example, by a first wireless communication device, in accordance with the present disclosure.

FIG. 10 is a diagram illustrating an example process 1000 performed, for example, by a first wireless communication device, in accordance with the present disclosure. Example process 1000 is an example where the first wireless communication device (e.g., UE 120, UE 610, first device 910) performs operations associated with secure link establishment.

As shown in FIG. 10, in some aspects, if process 1000 is part of a restricted discovery Model B, process 1000 may optionally include transmitting, to a second wireless communication device, a discovery message that includes a service code (block 1010). For example, the first wireless communication device (e.g., using communication manager 140 and/or transmission component 1204 depicted in FIG. 12) may transmit, to a second wireless communication device, a discovery message that includes a service code, as described above. In some aspects, the discovery message may include user information.

As shown in FIG. 10, in some aspects, whether for restricted discovery Model A or restricted discovery Model B, process 1000 may include receiving, from the second wireless communication device, a discovery message that includes the service code and the user information (block 1020). For example, the first wireless communication device (e.g., using communication manager 140 and/or reception component 1202 depicted in FIG. 12) may receive, from the second wireless communication device, a discovery message that includes the service code and the user information, as described above.

As further shown in FIG. 10, in some aspects, process 1000 may include verifying the service code (block 1030). For example, the first wireless communication device (e.g., using communication manager 140 and/or verification component 1208 depicted in FIG. 12) may verify the service code, as described above.

As further shown in FIG. 10, in some aspects, process 1000 may include transmitting, to the second wireless communication device, a connection message that includes protected user information and a protected service code derived from the service code (block 1040). For example, the first wireless communication device (e.g., using communication manager 140 and/or transmission component 1204 depicted in FIG. 12) may transmit, to the second wireless communication device, a connection message that includes protected user information and a protected service code derived from the service code, as described above. In some aspects, the protected user information is derived from the user information.

Process 1000 may include additional aspects, such as any single aspect or any combination of aspects described below and/or in connection with one or more other processes described elsewhere herein.

In a first aspect, the protected service code is derived from the service code by scrambling or encrypting the service code.

In a second aspect, alone or in combination with the first aspect, the protected service code is protected by a code-sending security parameter, a message indicator, or a combination thereof.

In a third aspect, alone or in combination with one or more of the first and second aspects, the protected service code is protected by a code-receiving security parameter, a directional bit, or a combination thereof. In some cases, the protected service code may be protected using a directional bit or a combination of the directional bit and a code-receiving security parameter.

In a fourth aspect, alone or in combination with one or more of the first through third aspects, the protected user information includes a protected PRUK ID.

In a fifth aspect, alone or in combination with one or more of the first through fourth aspects, the first wireless communication device is a remote UE and the second wireless communication device is a relay UE.

In a sixth aspect, alone or in combination with one or more of the first through fifth aspects, the discovery message is a PC5 discovery message.

In a seventh aspect, alone or in combination with one or more of the first through sixth aspects, the connection message includes at least a portion of the discovery message.

In an eighth aspect, alone or in combination with one or more of the first through seventh aspects, the connection message includes a hash of at least portion of the discovery message.

In a ninth aspect, alone or in combination with one or more of the first through eighth aspects, the connection message is a DCR.

In a tenth aspect, alone or in combination with one or more of the first through ninth aspects, the discovery message is protected.

In an eleventh aspect, alone or in combination with one or more of the first through tenth aspects, further comprising, prior to receiving the discovery message, transmitting an initial discovery message with the service code.

In a twelfth aspect, alone or in combination with one or more of the first through eleventh aspects, the initial discovery message is protected.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a first wireless communication device, in accordance with the present disclosure. Example process 1100 is an example where the first wireless communication device (e.g., UE 120, UE 620, second device 920) performs operations associated with secure link establishment. Note that the first wireless communication device in FIG. 11 may be the second wireless communication device of FIG. 10.

As shown in FIG. 11, in some aspects, if process 1100 is part of a restricted discovery Model B, process 1100 may include receiving, from a second wireless communication device, a discovery message that includes a service code (block 1110). For example, the first wireless communication device (e.g., using communication manager 140 and/or transmission component 1504 depicted in FIG. 15) may receive, from a second wireless communication device, a discovery message that includes a service code, as described above. In some aspects, the discovery message may include user information.

As shown in FIG. 11, in some aspects whether for restricted discovery Model A or restricted Model B, process 1100 may include transmitting, to the second wireless communication device, a discovery message that includes the service code (block 1120). For example, the first wireless communication device (e.g., using communication manager 140 and/or transmission component 1504 depicted in FIG. 15) may transmit, to the second wireless communication device, a discovery message that includes the service code, as described above. In some aspects, the discovery message includes user information.

As further shown in FIG. 11, in some aspects, process 1100 may include receiving, from the second wireless communication device, a connection message that includes protected user information and a protected service code derived from the service code (block 1130). For example, the first wireless communication device (e.g., using communication manager 140 and/or reception component 1502 depicted in FIG. 15) may receive, from the second wireless communication device, a connection message that includes protected user information and a protected service code derived from the service code, as described above. In some aspects, the protected user information is derived from the user information.

As further shown in FIG. 11, in some aspects, process 1100 may include setting up a connection with the second wireless communication device based at least in part on verifying the connection message (block 1140). For example, the first wireless communication device (e.g., using communication manager 140 and/or verification component 1508 depicted in FIG. 15) may set up a connection with the second wireless communication device based at least in part on verifying the connection message, as described above. In some aspects, the first wireless communication device is a relay UE, the second wireless communication device is a remote UE, and the discovery message is a PC5 discovery message.

Process 1100 may include additional aspects, such as any single aspect or any combination of aspects described below and/or in connection with one or more other processes described elsewhere herein.

In a first aspect, the protected service code is a scrambled or encrypted version of the service code.

In a second aspect, alone or in combination with the first aspect, the protected user information includes a protected PRUK ID.

In a third aspect, alone or in combination with one or more of the first and second aspects, verifying the connection message includes verifying the connection message based at least in part on the protected service code.

In a fourth aspect, alone or in combination with one or more of the first through third aspects, verifying the connection message includes verifying the connection message further based at least in part on a code-sending security parameter, a direction bit, or a combination thereof.

In a fifth aspect, alone or in combination with one or more of the first through fourth aspects, verifying the connection message includes verifying the connection message further based at least in part on a code-receiving security parameter, a message indicator, or a combination thereof.

In a sixth aspect, alone or in combination with one or more of the first through fifth aspects, verifying the connection message includes verifying whether the connection message at least partially matches the discovery message.

In a seventh aspect, alone or in combination with one or more of the first through sixth aspects, verifying the connection message includes verifying whether the connection message matches a hash of at least a portion of the discovery message.

In an eighth aspect, alone or in combination with one or more of the first through seventh aspects, verifying the connection message includes verifying the connection message based at least in part on a discovery filter.

In a ninth aspect, alone or in combination with one or more of the first through eighth aspects, the first wireless communication device is a relay UE and the second wireless communication device is a remote UE.

In a tenth aspect, alone or in combination with one or more of the first through ninth aspects, the discovery message is a PC5 discovery message.

In an eleventh aspect, alone or in combination with one or more of the first through tenth aspects, the connection message includes at least a portion of the discovery message.

In a twelfth aspect, alone or in combination with one or more of the first through eleventh aspects, the connection message is a DCR.

In a thirteenth aspect, alone or in combination with one or more of the first through twelfth aspects, the discovery message is protected.

In a fourteenth aspect, alone or in combination with one or more of the first through thirteenth aspects, process 1100 includes, prior to transmitting the discovery message, receiving an initial discovery message with the service code.

In a fifteenth aspect, alone or in combination with one or more of the first through fourteenth aspects, the initial discovery message is protected.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
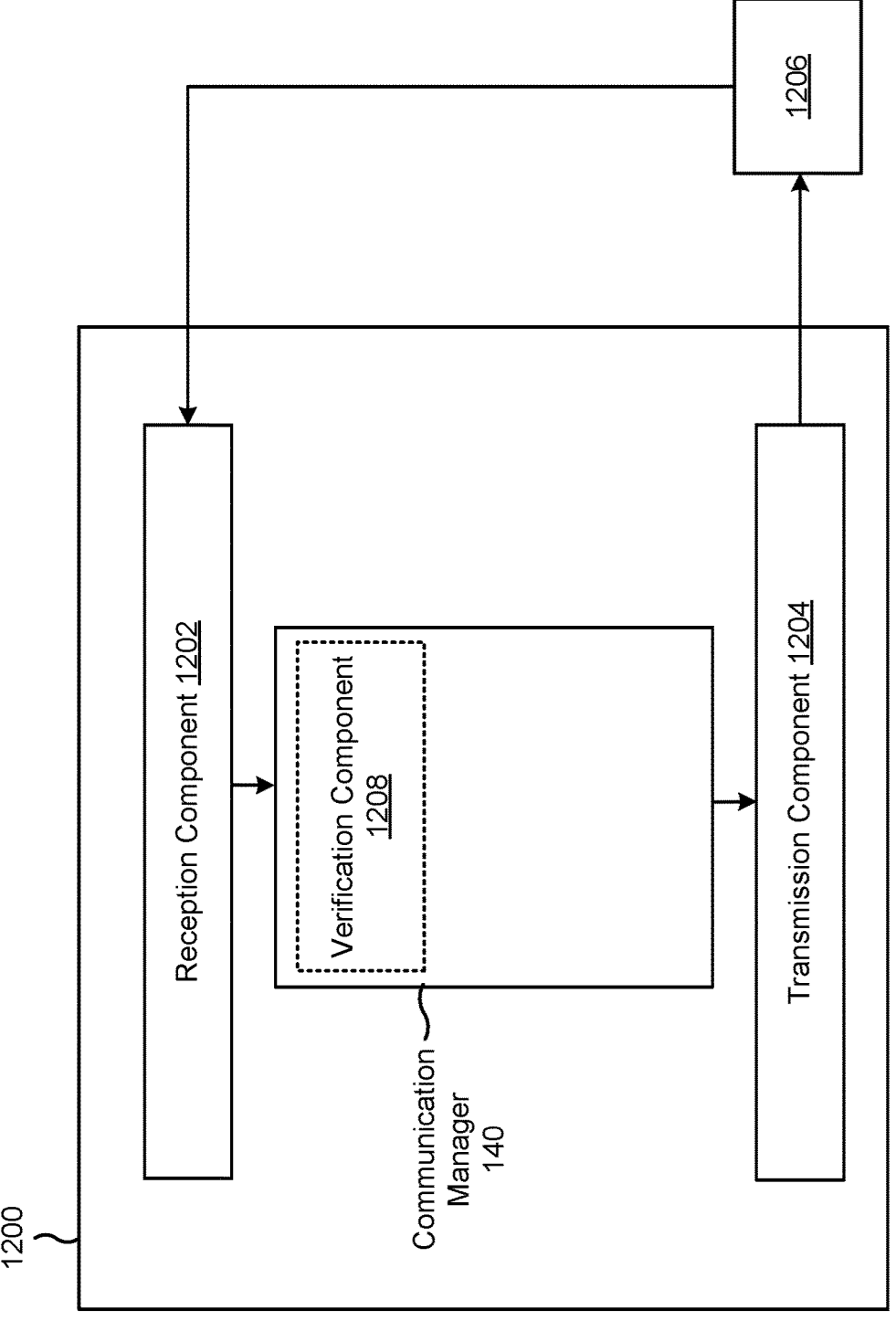
FIG. 12 is a block diagram of an example apparatus for wireless communication, in accordance with the present disclosure.

FIG. 12 is a block diagram of an example apparatus 1200 for wireless communication. The apparatus 1200 may be a first wireless communication device (e.g., UE 610, first device 910), or a first wireless communication device may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or a second wireless communication device, such as UE 620 or second device 920) using the reception component 1202 and the transmission component 1204. As further shown, the apparatus 1200 may include the communication manager 140. The communication manager 140 may include a verification component 1208, among other examples.

In some aspects, the apparatus 1200 may be configured to perform one or more operations described herein in connection with FIGS. 1-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the first wireless communication device described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the first wireless communication device described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the first wireless communication device described above in connection with FIG. 2. In some aspects, the transmission component 1204 may be co-located with the reception component 1202 in a transceiver.

The reception component 1202 may receive, from a second wireless communication device (e.g., UE 620, second device 920), a discovery message that includes a service code and user information. The verification component 1208 may verify the service code. The transmission component 1204 may transmit, to the second wireless communication device, a connection message that includes a protected service code that is derived from the service code and protected user information that is derived from the user information.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
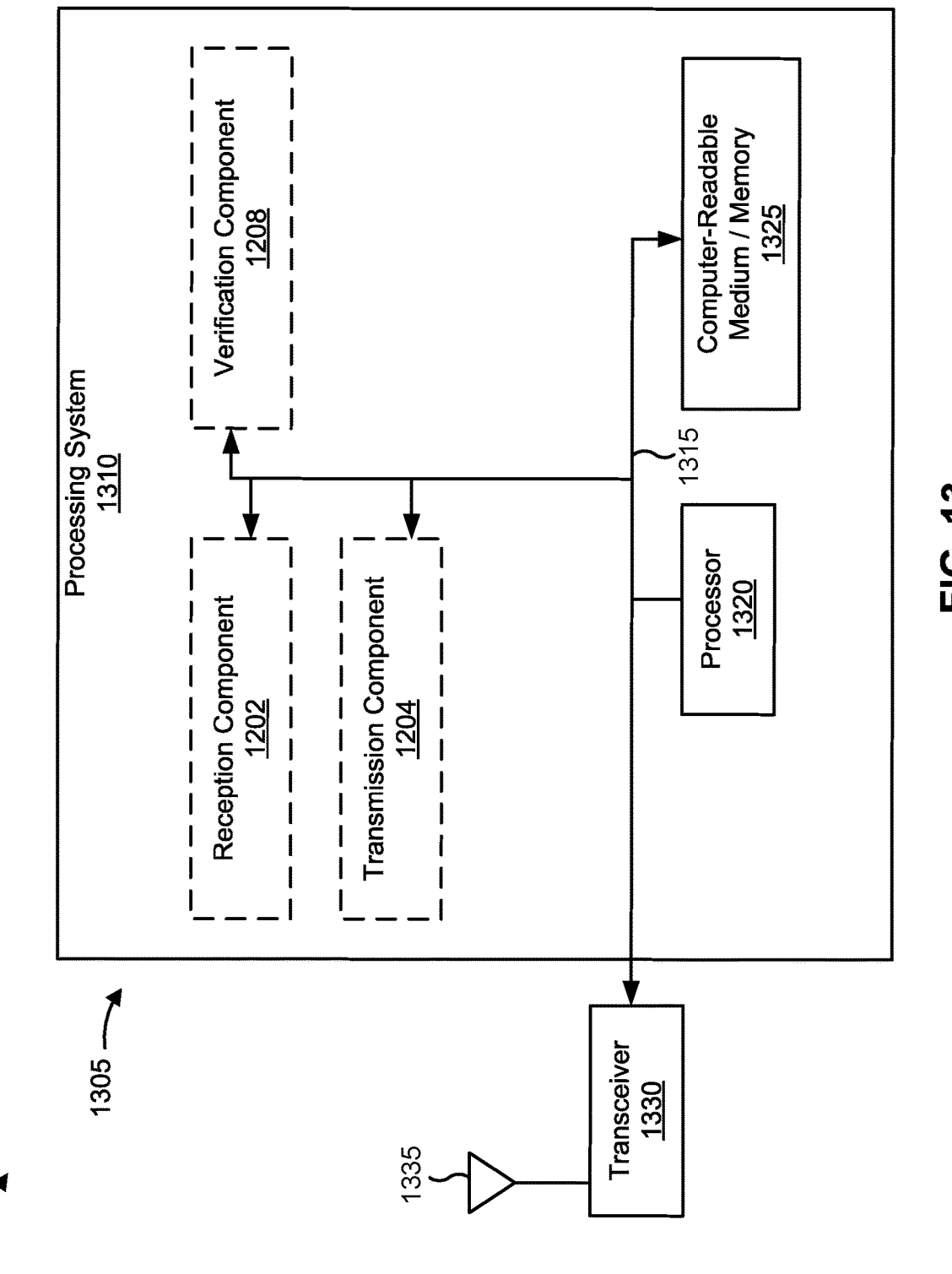
FIG. 13 is a diagram illustrating an example of a hardware implementation for an apparatus employing a processing system, in accordance with the present disclosure.

FIG. 13 is a diagram illustrating an example 1300 of a hardware implementation for an apparatus 1305 employing a processing system 1310. The apparatus 1305 may be a first wireless communication device (e.g., UE 610, first device 910).

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, and/or power management circuits.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1202. In addition, the transceiver 1330 receives information from the processing system 1310, specifically the transmission component 1204, and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer-readable medium/memory 1325, one or more hardware modules coupled to the processor 1320, or some combination thereof.

In some aspects, the processing system 1310 may be a component of the UE 120 and may include the memory 282 and/or at least one of the TX MIMO processor 266, the receive (RX) processor 258, and/or the controller/processor 280. In some aspects, the apparatus 1305 for wireless communication includes means for receiving, from a second wireless communication device, a discovery message that includes a service code and user information. The apparatus 1305 may include means for verifying the service code, and/or means for transmitting, to the second wireless communication device, a connection message that includes a protected service code that is derived from the service code and protected user information that is derived from the user information. The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein. In some aspects, transceiver 1330 may, prior to receiving the discovery message, transmit an initial discovery message with the service code.

FIG. 13 is provided as an example. Other examples may differ from what is described in connection with FIG. 13.

Figure 14:
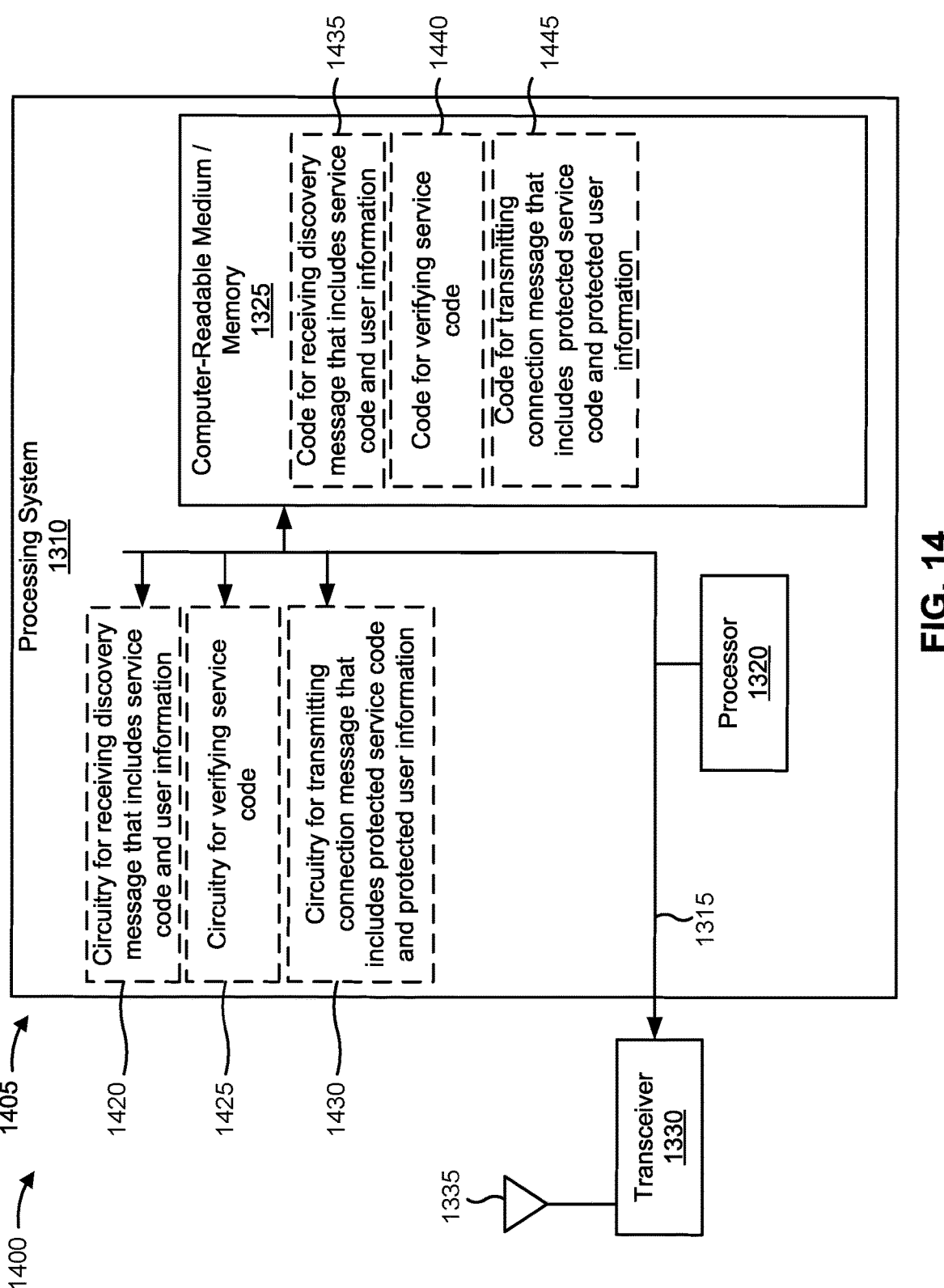
FIG. 14 is a diagram illustrating an example of an implementation of code and circuitry for an apparatus, in accordance with the present disclosure.

FIG. 14 is a diagram illustrating an example 1400 of an implementation of code and circuitry for an apparatus 1405. Apparatus 1405 may be a first wireless communication device (e.g., UE 610, first device 910).

As further shown in FIG. 14, the apparatus may include circuitry for receiving, from a second wireless communication device, a discovery message that includes a service code and user information (circuitry 1420). For example, the apparatus may include circuitry to enable the apparatus to receive, from a second wireless communication device, a discovery message that includes a service code and user information.

As further shown in FIG. 14, the apparatus may include circuitry for verifying the service code (circuitry 1425). For example, the apparatus may include circuitry to enable the apparatus to verify the service code.

As further shown in FIG. 14, the apparatus may include circuitry for transmitting, to the second wireless communication device, a connection message that includes a protected service code that is derived from the service code and protected user information that is derived from the user information (circuitry 1430). For example, the apparatus may include circuitry to enable the apparatus to transmit, to the second wireless communication device, a connection message that includes a protected service code that is derived from the service code and protected user information that is derived from the user information.

As further shown in FIG. 14, the apparatus may include, stored in computer-readable medium 1325, code for receiving, from a second wireless communication device, a discovery message that includes a service code and user information (code 1435). For example, the apparatus may include code that, when executed by the processor 1320, may cause processor 1320 to receive, from a second wireless communication device, a discovery message that includes a service code and user information.

As further shown in FIG. 14, the apparatus may include, stored in computer-readable medium 1325, code for verifying the service code (code 1440). For example, the apparatus may include code that, when executed by processor 1320, may cause processor 1320 to cause transceiver 1330 to verify the service code.

As further shown in FIG. 14, the apparatus may include, stored in computer-readable medium 1325, code for transmitting, to the second wireless communication device, a connection message that includes a protected service code that is derived from the service code and protected user information that is derived from the user information (code 1445). For example, the apparatus may include code that, when executed by processor 1320, may cause processor 1320 to cause transceiver 1330 to transmit, to the second wireless communication device, a connection message that includes a protected service code that is derived from the service code and protected user information that is derived from the user information.

FIG. 14 is provided as an example. Other examples may differ from what is described in connection with FIG. 14.

Figure 15:
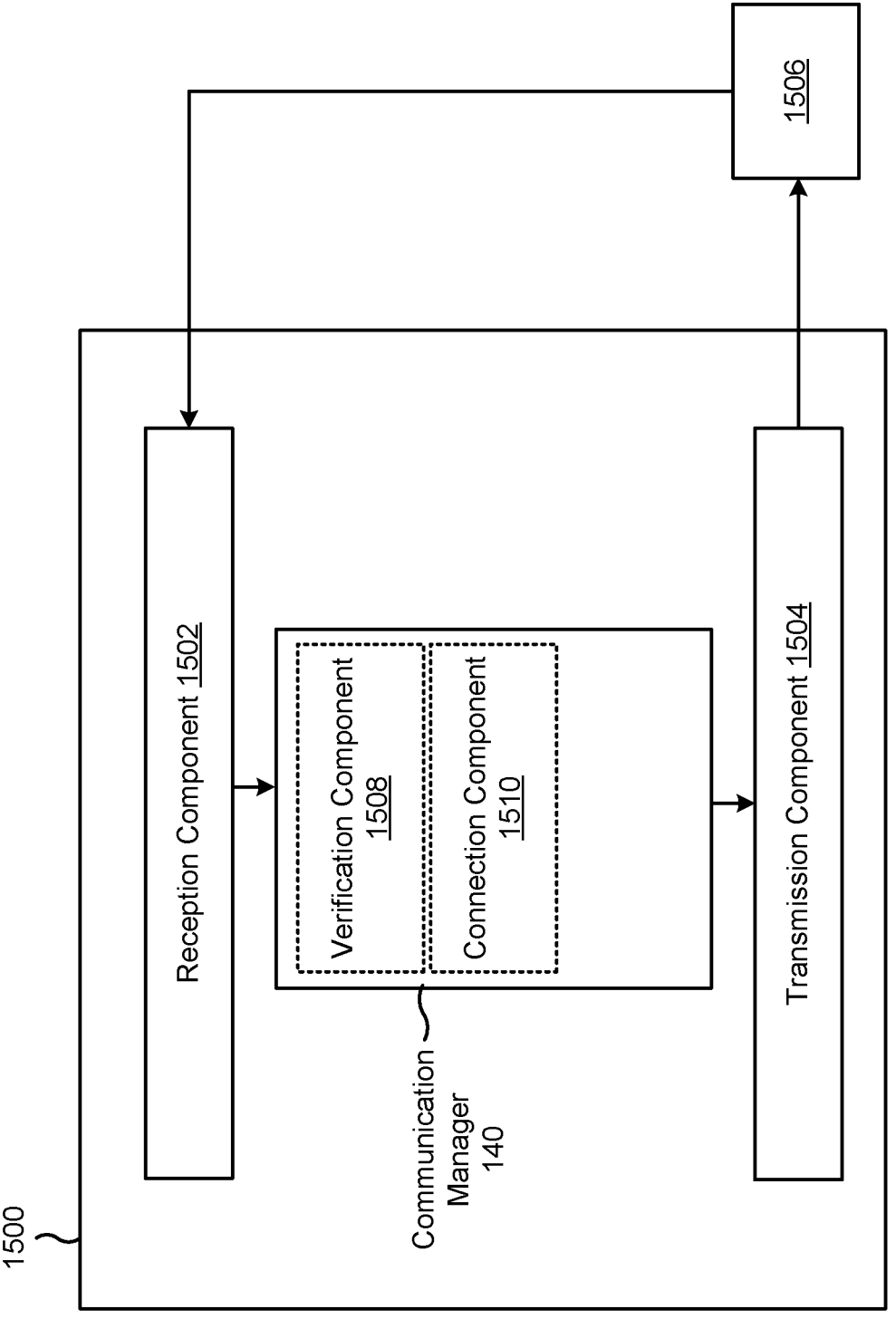
FIG. 15 is a block diagram of an example apparatus for wireless communication, in accordance with the present disclosure.

FIG. 15 is a block diagram of an example apparatus 1500 for wireless communication. The apparatus 1500 may be a first wireless communication device (e.g., UE 120, UE 620, second device 920), or a first wireless communication device may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include a verification component 1508 and/or a connection component 1510, among other examples.

In some aspects, the apparatus 1500 may be configured to perform one or more operations described herein in connection with FIGS. 1-9. Additionally, or alternatively, the apparatus 1500 may be configured to perform one or more processes described herein, such as process 1100 of FIG. 11. In some aspects, the apparatus 1500 and/or one or more components shown in FIG. 15 may include one or more components of the first wireless communication device described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a demodulator, a MIMO detector, a receive processor, a controller/processor, a memory, or a combination thereof, of the first wireless communication device described above in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the first wireless communication device described above in connection with FIG. 2. In some aspects, the transmission component 1504 may be co-located with the reception component 1502 in a transceiver.

The transmission component 1504 may transmit, to a second wireless communication device, a discovery message that includes a service code and user information. The reception component 1502 may receive, from the second wireless communication device, a connection message that includes a protected service code that is derived from the service code and protected user information that is derived from the user information. The connection component 1510 may set up a connection with the second wireless communication device based at least in part on verifying the connection message.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
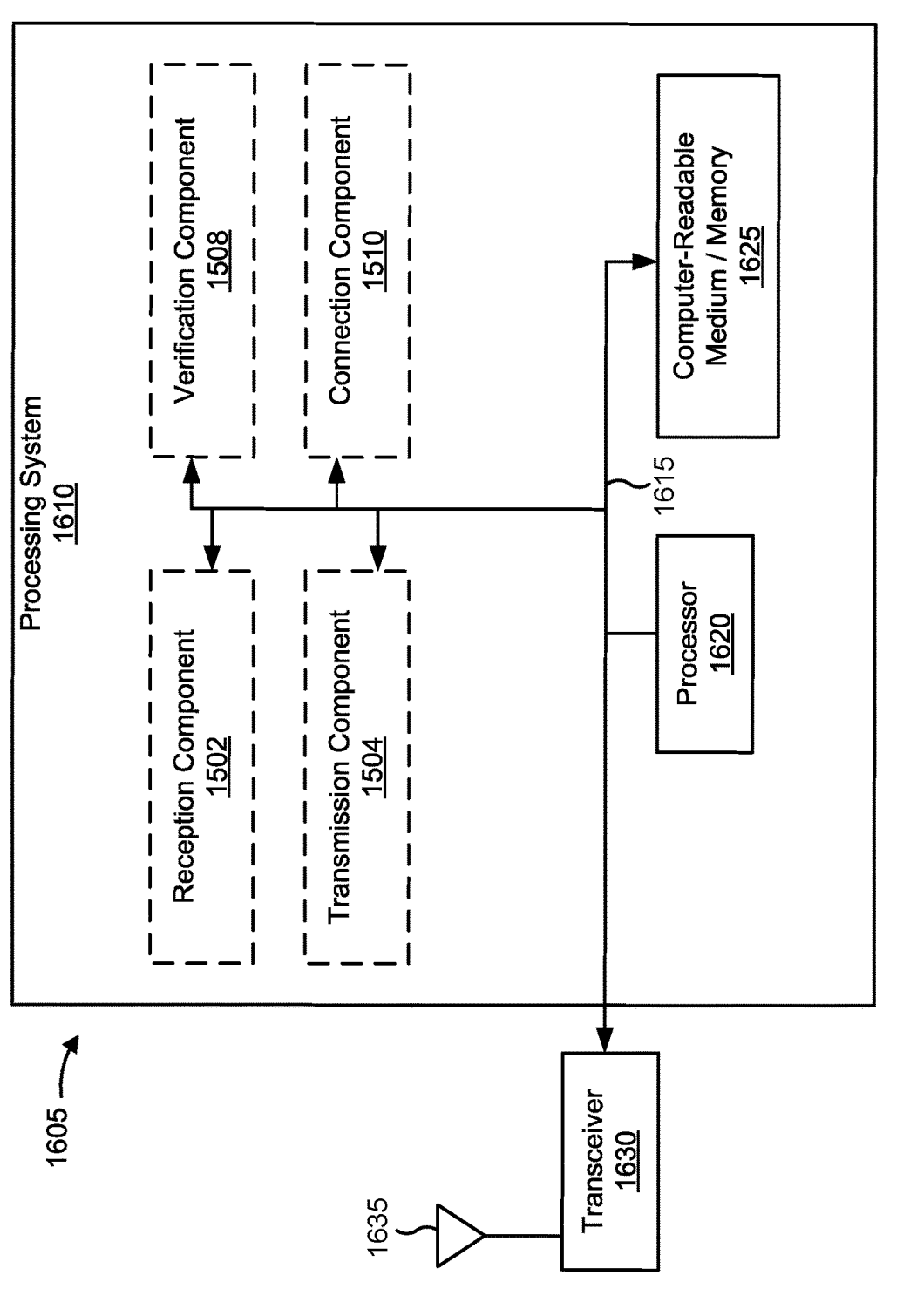
FIG. 16 is a diagram illustrating an example of a hardware implementation for an apparatus employing a processing system, in accordance with the present disclosure.

FIG. 16 is a diagram illustrating an example 1600 of a hardware implementation for an apparatus 1605 employing a processing system 1610. The apparatus 1605 may be a first wireless communication device (e.g., UE 120, UE 620, second device 920).

The processing system 1610 may be implemented with a bus architecture, represented generally by the bus 1615. The bus 1615 may include any number of interconnecting buses and bridges depending on the specific application of the processing system 1610 and the overall design constraints. The bus 1615 links together various circuits including one or more processors and/or hardware components, represented by the processor 1620, the illustrated components, and the computer-readable medium/memory 1625. The bus 1615 may also link various other circuits, such as timing sources, peripherals, voltage regulators, and/or power management circuits.

The processing system 1610 may be coupled to a transceiver 1630. The transceiver 1630 is coupled to one or more antennas 1635. The transceiver 1630 provides a means for communicating with various other apparatuses over a transmission medium. The transceiver 1630 receives a signal from the one or more antennas 1635, extracts information from the received signal, and provides the extracted information to the processing system 1610, specifically the reception component 1502. In addition, the transceiver 1630 receives information from the processing system 1610, specifically the transmission component 1504, and generates a signal to be applied to the one or more antennas 1635 based at least in part on the received information.

The processing system 1610 includes a processor 1620 coupled to a computer-readable medium/memory 1625. The processor 1620 is responsible for general processing, including the execution of software stored on the computer-readable medium/memory 1625. The software, when executed by the processor 1620, causes the processing system 1610 to perform the various functions described herein for any particular apparatus. The computer-readable medium/memory 1625 may also be used for storing data that is manipulated by the processor 1620 when executing software. The processing system further includes at least one of the illustrated components. The components may be software modules running in the processor 1620, resident/stored in the computer-readable medium/memory 1625, one or more hardware modules coupled to the processor 1620, or some combination thereof.

In some aspects, the processing system 1610 may be a component of the UE 120 and may include the memory 282 and/or at least one of the TX MIMO processor 266, the RX processor 258, and/or the controller/processor 280. In some aspects, the apparatus 1605 for wireless communication includes means for means for transmitting, to a second wireless communication device, a discovery message that includes a service code and user information. The apparatus 1605 may include means for receiving, from the second wireless communication device, a connection message that includes a protected service code that is derived from the service code and protected user information that is derived from the user information, and/or means for setting up a connection with the second wireless communication device based at least in part on verifying the connection message. The aforementioned means may be one or more of the aforementioned components of the apparatus 1500 and/or the processing system 1610 of the apparatus 1605 configured to perform the functions recited by the aforementioned means. As described elsewhere herein, the processing system 1610 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 16 is provided as an example. Other examples may differ from what is described in connection with FIG. 16.

Figure 17:
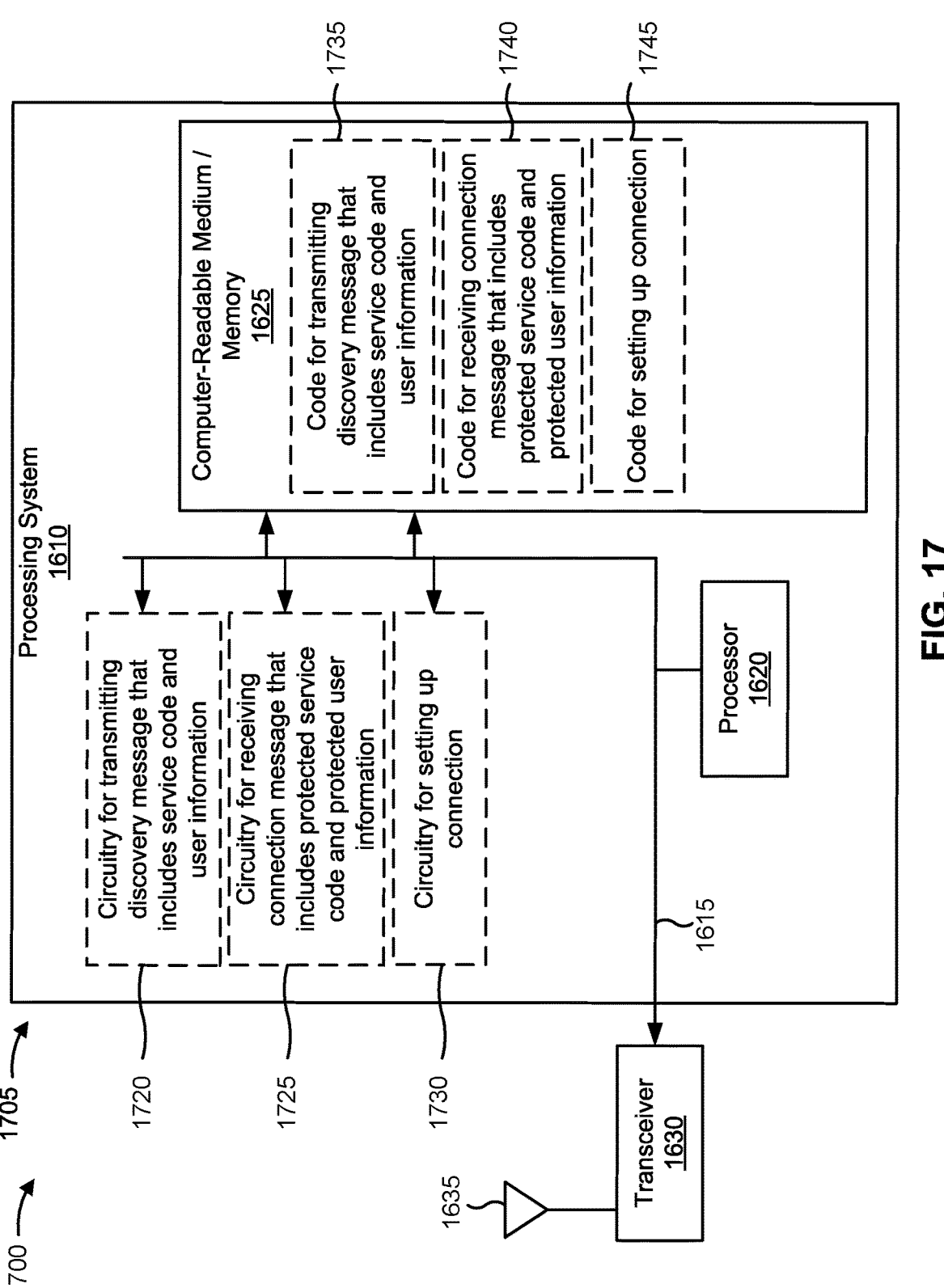
FIG. 17 is a diagram illustrating an example of an implementation of code and circuitry for an apparatus, in accordance with the present disclosure.

FIG. 17 is a diagram illustrating an example 1700 of an implementation of code and circuitry for an apparatus 1705. Apparatus 1705 may be a first wireless communication device (e.g., UE 120, UE 620, second device 920).

As further shown in FIG. 17, the apparatus may include circuitry for transmitting, to a second wireless communication device, a discovery message that includes a service code and user information (circuitry 1720). For example, the apparatus may include circuitry to enable the apparatus to transmit, to a second wireless communication device, a discovery message that includes a service code and user information.

As further shown in FIG. 17, the apparatus may include circuitry for receiving, from the second wireless communication device, a connection message that includes a protected service code that is derived from the service code and protected user information that is derived from the user information (circuitry 1725). For example, the apparatus may include circuitry to enable the apparatus to receiving, from the second wireless communication device, a connection message that includes a protected service code that is derived from the service code and protected user information that is derived from the user information.

As further shown in FIG. 17, the apparatus may include circuitry for setting up a connection with the second wireless communication device based at least in part on verifying the connection message (circuitry 1730). For example, the apparatus may include circuitry to enable the apparatus to set up a connection with the second wireless communication device based at least in part on verifying the connection message.

As further shown in FIG. 17, the apparatus may include, stored in computer-readable medium 1625, code for transmitting, to a second wireless communication device, a discovery message that includes a service code and user information (code 1735). For example, the apparatus may include code that, when executed by the processor 1620, may cause processor 1620 to transmit, to a second wireless communication device, a discovery message that includes a service code and user information.

As further shown in FIG. 17, the apparatus may include, stored in computer-readable medium 1625, code for receiving, from the second wireless communication device, a connection message that includes a protected service code that is derived from the service code and protected user information that is derived from the user information (code 1740). For example, the apparatus may include code that, when executed by processor 1620, may cause processor 1620 to cause transceiver 1630 to receive, from the second wireless communication device, a connection message that includes a protected service code that is derived from the service code and protected user information that is derived from the user information.

As further shown in FIG. 17, the apparatus may include, stored in computer-readable medium 1625, code for setting up a connection with the second wireless communication device based at least in part on verifying the connection message (code 1745). For example, the apparatus may include code that, when executed by processor 1620, may cause processor 1620 to cause transceiver 1630 to set up a connection with the second wireless communication device based at least in part on verifying the connection message.

FIG. 17 is provided as an example. Other examples may differ from what is described in connection with FIG. 17.

Figure 18:
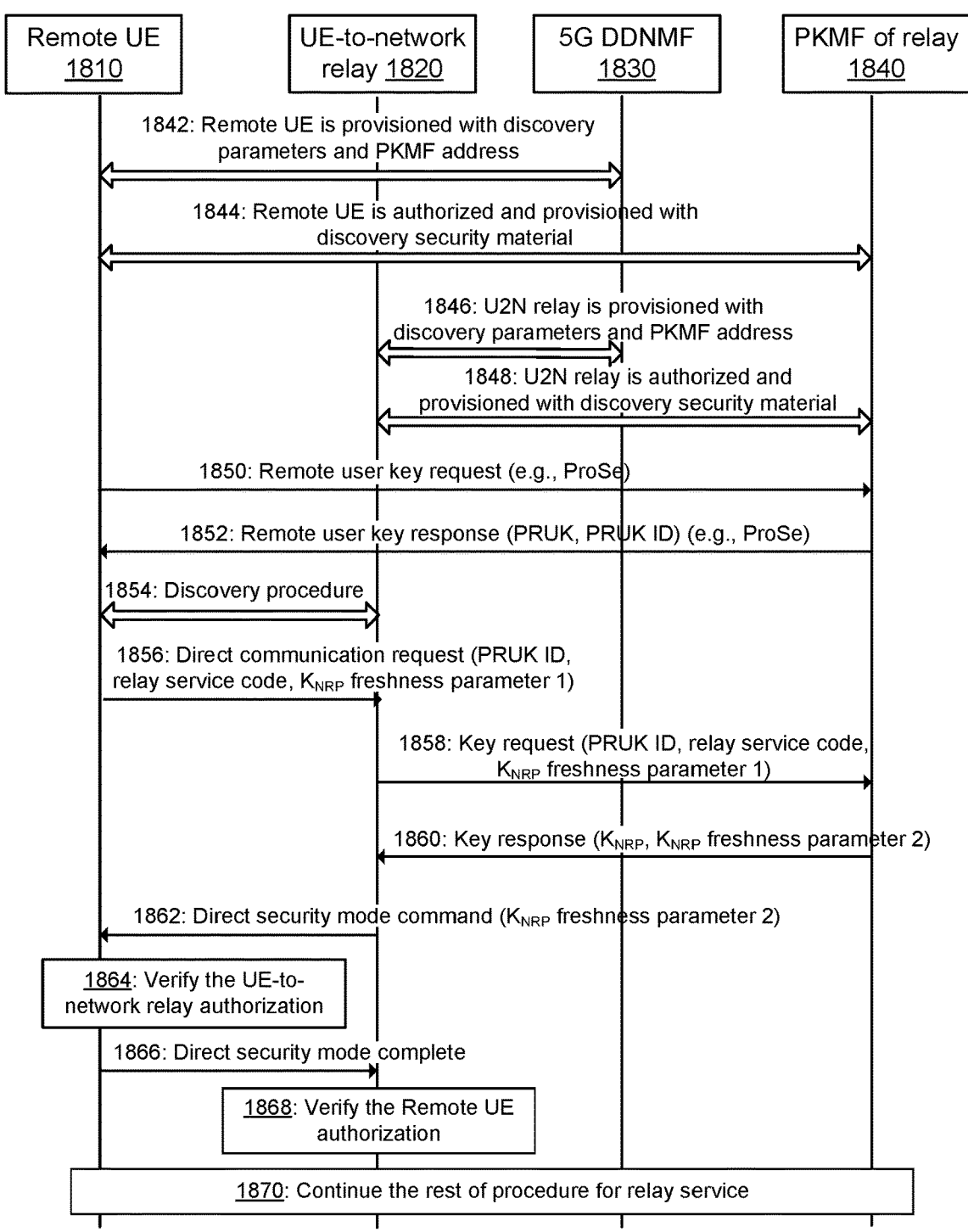
FIG. 18 is a diagram illustrating an example of secure link establishment, in accordance with the present disclosure.

FIG. 18 is a diagram illustrating an example 1800 of secure link establishment, in accordance with the present disclosure. Example 1800 shows a remote UE 1810 that may communicate with a network (e.g., wireless network 100) using a UE-to-network relay 1820. The network may include a 5G direct discovery name management function (DDNMF) 1830 and a management function, such as ProSe key management function (PKMF) 1840.

The remote UE 1810 may be provisioned with the discovery security materials and a remote user key when the UE 1810 is in coverage. Also, the security materials may have an expiration time, after which the security materials become invalid. When the security materials become invalid, the remote UE 1810 is to be in coverage to obtain fresh security materials in order to connect to the network via the UE-to-network relay 1820.

As shown by reference number 1842, the remote UE 1810 may obtain the discovery parameters and a PKMF address from the 5G DDNMF 1830. The remote UE 1810 may get multiple PKMF addresses for different public land mobile network (PLMNs). If the remote UE 1810 receives multiple PKMF addresses, the remote UE 1810 may contact each of the PKMFs separately. The remote UE 1810 may contact the PKMFs directly or via the PKMF of a corresponding home PLMN. As shown by reference number 1844, the remote UE 1810 may be authorized to receive UE-to-network relay service and may obtain the discovery security materials from the PKMF 1840. As shown by reference number 1846, the UE-to-network relay 1820 may obtain the discovery parameters and the PKMF address from the 5G DDNMF. As shown by reference number 1848, the UE-to-network relay 1820 may be authorized to act as a relay and may obtain the discovery security materials from the PKMF 1840. The remote UE 1810 and the UE-to-network relay 1820 may communicate with the PKMF 1840 via a PC8 reference point (as in LTE ProSe). The security for the PC8 interface may rely on Ua security if a generic bootstrapping architecture (GBA) [12] is used or rely on Ua* when authentication and key management for applications (AKMA) is used. Note that for commercial services, the PKMF 1840 may be located in the operator's network. For public safety examples, the PKMF 1840 may be managed by a public safety service provider.

As shown by reference number 1850, the remote UE 1810 may transmit a PRUK request message to the PKMF 1840 of the UE-to-network relay 1820. As shown by reference number 1852, the PKMF 1840 may check whether the remote UE 1810 is authorized to receive the UE-to-network relay service. This check is performed by using the identity of the remote UE 1810 that is bound to the keys that established the secure connection between the remote UE 1810 and the PKMF 1840 in step 1844. If the remote UE 1810 is authorized to receive the service, the PKMF 1840 may transmit a PRUK and a PRUK ID to the remote UE 1810.

As shown by reference number 1854, the discovery procedure may be performed between the remote UE 1810 and the UE-to-network relay 1820 using the discovery parameters and the discovery security materials. As shown by reference number 1856, the remote UE 1810 may transmit a DCR that includes the PRUK ID, an RSC of the UE-to-network relay service and $K_{NRP}$ freshness parameter 1. As shown by reference number 1858, the UE-to-network relay 1820 may transmit a key request message that includes the PRUK ID, the RSC, and the $K_{NRP}$ freshness parameter 1 to the PKMF 1840.

The PRUK ID and RSC may be protected by scrambling when restricted discovery is used between the remote UE 1810 and the UE-to-network relay 1820 (since code sending/receiving security parameters for scrambling are provisioned). However, when open discovery is used, the remote UE 1810 may not use scrambling. In some aspects, when open discovery is used, the PRUK ID should be reallocated after the PRUK ID is transmitted over the air (in a DCR message). Accordingly, at step 1858, on receiving the key request message, the PKMF 1840 may reallocate the PRUK ID and protect (e.g., encrypt) the PRUK ID based at least in part on the PRUK. At step 1860, the PKMF 1840 may include the protected PRUK ID in the key response message. The UE-to-network relay 1820 may forward the protected PRUK ID through a direct security mode command at step 1862. The remote UE 1810 may unprotect (e.g., unscramble or decrypt) the protected PRUK ID based at least in part on the PRUK and update the stored PRUK ID to be the received PRUK ID.

By protecting the PRUK ID, an attacker between the remote UE 1810 and the UE-to-network relay 1820 cannot correlate the PRUK IDs used for the different DCRs and therefore cannot identify whether the same user or different users use the ProSe service. Furthermore, if the PRUK ID is not protected, the attacker that can identify the PRUK ID of the remote UE 1810 and the RSC may repeatedly request the DCR to make the PKMF 1840 repeat a ProSe key generation procedure (steps 1858 and 1860).

As shown by reference number 1860, on receiving the key request message, the PKMF 1840 may check whether the UE-to-network relay 1820 is authorized to act as a relay to the remote UE 1810. This may be performed by using an identity of the UE-to-network relay 1820 that is bound to the keys that established the secure connection between the UE-to-network relay 1820 and the PKMF 1840 in step 1848. If the UE-to-network relay 1820 is authorized to provide the relay service, the PKMF 1840 may generate $K_{NRP}$ freshness parameter 2 and derive $K_{NRP}$ using the PRUK identified by the PRUK ID, the $K_{NRP}$ freshness parameter 1, and the $K_{NRP}$ freshness parameter 2. Then, the PKMF 1840 may transmit a key response message that includes the $K_{NRP}$ and the $K_{NRP}$ freshness parameter 2 to the UE-to-network relay 1820.

As shown by reference number 1862, the UE-to-network relay 1820 may transmit a direct security mode command message to the remote UE 1810. The message may include the $K_{NRP}$ freshness parameter 2 and may be protected based at least in part on the session key ($K_{NRP-SESS}$) derived from the $K_{NRP}$. The direct security mode command message may be integrity protected using an integrity protection key ($K_{NRPIK}$) derived from the session key ($K_{NRP-SESS}$). As shown by reference number 1864, the remote UE 1810 may derive the $K_{NRP}$ from the PRUK, the RSC, the $K_{NRP}$ freshness parameter 1, and the received $K_{NRP}$ freshness parameter 2. The remote UE 1810 may then derive the session key ($K_{NRP-SESS}$) in the same manner as the UE-to-network relay 1820 and may process the direct security mode command. The remote UE 1810 may further derive the integrity protection key ($K_{NRPIK}$) and the encryption key ($K_{NRPEK}$) from the session key ($K_{NRP-SESS}$). Then, the remote UE 1810 may check the integrity of the direct security mode command message. If the integrity check is successful, the remote UE 1810 may be assured that the UE-to-network relay 1820 is authorized to provide the relay service. As shown by reference number 1866, the remote UE

1810 may respond with a direct security mode complete message to the UE-to-network relay 1820. The direct security mode complete message may be ciphered and integrity protected. As shown by reference number 1868, on receiving and processing the direct security mode complete message, the UE-to-network relay 1820 may check the integrity of the direct security mode complete message. If the integrity check is successful, the UE-to-network relay 1820 may be assured that the remote UE 1810 is authorized to obtain the relay service. As shown by reference number 1870, the remote UE 1810 and the UE-to-network relay 1820 may continue the rest of the procedure for the relay service over the secure PC5 link. The rest of procedure may be determined based at least in part on a UE-to-network relay type (e.g., L2 or L3 relay).

As indicated above, FIG. 18 is provided as an example. Other examples may differ from what is described with regard to FIG. 18.

The following provides an overview of some Aspects of the present disclosure:

Aspect 1: A method of wireless communication performed by a first wireless communication device, comprising: receiving, from a second wireless communication device, a discovery message that includes a service code; verifying the service code; and transmitting, to the second wireless communication device, a connection message that includes a protected service code that is derived from the service code and protected user information.

Aspect 2: The method of Aspect 1, wherein the protected service code is derived from the service code by scrambling or encrypting the service code.

Aspect 3: The method of Aspect 2, wherein the protected service code is protected using a code-sending security parameter, a message indicator, or a combination thereof.

Aspect 4: The method of Aspect 2, wherein the protected service code is protected using a code-receiving security parameter, a directional bit, or a combination thereof.

Aspect 5: The method of any of Aspects 1-4, wherein the protected user information includes a protected proximity services relay user key identifier.

Aspect 6: The method of any of Aspects 1-5, wherein the first wireless communication device is a remote user equipment (UE) and the second wireless communication device is a relay UE.

Aspect 7: The method of any of Aspects 1-6, wherein the discovery message is a PC5 discovery message.

Aspect 8: The method of any of Aspects 1-7, wherein the connection message includes at least a portion of the discovery message.

Aspect 9: The method of any of Aspects 1-8, wherein the connection message includes a hash of at least portion of the discovery message.

Aspect 10: The method of any of Aspects 1-9, wherein the connection message is a direct communication request.

Aspect 11: The method of any of Aspects 1-10, wherein the discovery message is protected.

Aspect 12: The method of any of Aspects 1-11, further comprising, prior to receiving the discovery message, transmitting an initial discovery message with the service code.

Aspect 13: The method of Aspect 12, wherein the initial discovery message is protected.

Aspect 14: A method of wireless communication performed by a first wireless communication device, comprising: transmitting, to a second wireless communication device, a discovery message that includes a service code and user information; receiving, from the second wireless communication device, a connection message that includes a protected service code that is derived from the service code and protected user information that is derived from the user information; and setting up a connection with the second wireless communication device based at least in part on verifying the connection message.

Aspect 15: The method of Aspect 14, wherein the protected service code is a scrambled or encrypted version of the service code.

Aspect 16: The method of Aspect 14 or 15, wherein the protected user information includes a protected proximity services relay user key identifier.

Aspect 17: The method of any of Aspects 14-16, wherein verifying the connection message includes verifying the connection message based at least in part on the protected service code.

Aspect 18: The method of Aspect 17, wherein verifying the connection message includes verifying the connection message further based at least in part on a code-sending security parameter, a direction bit, or a combination thereof.

Aspect 19: The method of Aspect 17, wherein verifying the connection message includes verifying the connection message further based at least in part on a code-receiving security parameter, a message indicator, or a combination thereof.

Aspect 20: The method of any of Aspects 14-19, wherein verifying the connection message includes verifying whether the connection message at least partially matches the discovery message.

Aspect 21: The method of any of Aspects 14-20, wherein verifying the connection message includes verifying whether the connection message matches a hash of at least a portion of the discovery message.

Aspect 22: The method of any of Aspects 14-21, wherein verifying the connection message includes verifying the connection message based at least in part on a discovery filter.

Aspect 23: The method of any of Aspects 14-22, wherein the first wireless communication device is a relay user equipment (UE) and the second wireless communication device is a remote UE.

Aspect 24: The method of any of Aspects 14-23, wherein the discovery message is a PC5 discovery message.

Aspect 25: The method of any of Aspects 14-24, wherein the connection message includes at least a portion of the discovery message.

Aspect 26: The method of any of Aspects 14-25, wherein the connection message is a direct communication request.

Aspect 27: The method of any of Aspects 14-26, wherein the discovery message is protected.

Aspect 28: The method of any of Aspects 14-27, further comprising, prior to transmitting the discovery message, receiving an initial discovery message with the service code.

Aspect 29: The method of Aspect 28, wherein the initial discovery message is protected.

Aspect 30: An apparatus for wireless communication at a device, comprising a processor; memory coupled with the processor; and instructions stored in the memory and executable by the processor to cause the apparatus to perform the method of one or more of Aspects 1-29.

Aspect 31: A device for wireless communication, comprising a memory and one or more processors coupled to the memory, the one or more processors configured to perform the method of one or more of Aspects 1-29.

Aspect 32: An apparatus for wireless communication, comprising at least one means for performing the method of one or more of Aspects 1-29.

Aspect 33: A non-transitory computer-readable medium storing code for wireless communication, the code comprising instructions executable by a processor to perform the method of one or more of Aspects 1-29.

Aspect 34: A non-transitory computer-readable medium storing a set of instructions for wireless communication, the set of instructions comprising one or more instructions that, when executed by one or more processors of a device, cause the device to perform the method of one or more of Aspects 1-29.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device for wireless communication, comprising:
   one or more memories; and
   one or more processors coupled to the one or more memories, the one or more processors configured to cause the first wireless communication device to:
      receive, from a second wireless communication device, a discovery message that includes a service code;
      verify the service code; and
      transmit, to the second wireless communication device, a connection message that includes protected user information and a protected service code, wherein the protected service code is derived from the service code.

2. The first wireless communication device of claim 1, wherein the protected service code is derived from the service code by encryption of the service code.

3. The first wireless communication device of claim 2, wherein the protected service code is protected by one or more code-sending security parameters, a message indicator, or a combination thereof.

4. The first wireless communication device of claim 2, wherein the protected service code is protected by one or more code-receiving security parameters.

5. The first wireless communication device of claim 4, wherein to cause the first wireless communication device to verify the service code, the one or more processors are configured to cause the first wireless communication device to:
   unscramble the service code using a first code-receiving security parameter of the one or more code-receiving security parameters, wherein the first code-receiving security parameter is one of a discovery user confidentiality key (DUCK) or a discovery user scrambling key (DUSK);
   determine whether the service code matches a discovery filter; and
   perform a message integrity check (MIC) based at least in part on a second code-receiving security parameter of the one or more code-receiving security parameters, wherein the second code-receiving security parameter is a discovery user integrity key (DUIK).

6. The first wireless communication device of claim 4, wherein the one or more code-receiving security parameters comprise a discovery user confidentiality key (DUCK), a discovery user scrambling key (DUSK), a discovery user integrity key (DUIK), or a combination thereof.

7. The first wireless communication device of claim 2, wherein the protected service code is protected based at least in part on a directional bit or a combination of the directional bit and one or more code-receiving security parameters.

8. The first wireless communication device of claim 1, wherein the protected user information includes a protected proximity services relay user key identifier.

9. The first wireless communication device of claim 1, wherein the first wireless communication device is a remote user equipment (UE), the second wireless communication device is a relay UE, and the discovery message is a PC5 discovery message.

10. The first wireless communication device of claim 1, wherein the connection message includes at least a portion of the discovery message.

11. The first wireless communication device of claim 1, wherein the connection message is a direct communication request.

12. The first wireless communication device of claim 1, wherein the discovery message is protected.

13. The first wireless communication device of claim 1, further comprising a transceiver, wherein the one or more processors are configured to cause the first wireless communication device to:
   transmit, by the transceiver, prior to the reception of the discovery message, an initial discovery message with the service code.

14. The first wireless communication device of claim 13, wherein the initial discovery message is protected.

15. A first wireless communication device for wireless communication, comprising:
   one or more memories; and
   one or more processors coupled to the one or more memories, the one or more processors configured to cause the first wireless communication device to:
      transmit, to a second wireless communication device, a discovery message that includes a service code;
      receive, from the second wireless communication device, a connection message that includes protected user information and a protected service code, wherein the protected service code is derived from the service code; and
      set up a connection with the second wireless communication device based at least in part on verification of the connection message.

16. The first wireless communication device of claim 15, wherein the protected service code is an encrypted version of the service code.

17. The first wireless communication device of claim 15, wherein the protected user information includes a protected proximity services relay user key identifier.

18. The first wireless communication device of claim 15, wherein the one or more processors, to verify the connection message, are configured to verify the connection message based at least in part on the protected service code.

19. The first wireless communication device of claim 13, wherein the first wireless communication device is a relay user equipment (UE), the second wireless communication device is a remote UE, and the discovery message is a PC5 discovery message.

20. The first wireless communication device of claim 19, wherein the one or more processors, to verify the connection message, are configured to cause the first wireless communication device to:
   verify an integrity of the connection message further based at least in part on a code-sending security parameter of one or more code-sending security parameters, wherein the code-sending security parameter is a discovery user integrity key (DUIK).

21. The first wireless communication device of claim 20, wherein the one or more code-sending security parameters comprise a discovery user confidentiality key (DUCK), a discovery user scrambling key (DUSK), the DUIK, or a combination thereof.

22. The first wireless communication device of claim 19, wherein the one or more processors, to verify the connection message, are configured to cause the first wireless communication device to:

verify an integrity of the connection message further based at least in part on a code-receiving security parameter of one or more code-receiving security parameters, a message indicator, or a combination thereof, wherein the code-receiving security parameter is a discovery user integrity key (DUIK).

23. The first wireless communication device of claim 15, wherein the one or more processors, to verify the connection message, are configured to cause the first wireless communication device to:

verify whether the connection message at least partially matches the discovery message.

24. The first wireless communication device of claim 15, wherein the one or more processors, to verify the connection message, are configured to verify the connection message based at least in part on a discovery filter.

25. The first wireless communication device of claim 15, wherein the connection message includes at least a portion of the discovery message.

26. The first wireless communication device of claim 15, wherein the connection message is a direct communication request.

27. The first wireless communication device of claim 15, wherein the discovery message is protected.

28. The first wireless communication device of claim 15, wherein the one or more processors are configured to cause the first wireless communication device to:

receive an initial discovery message, prior to the transmission of the discovery message, wherein the initial discovery message includes the service code, and wherein the initial discovery message is protected.

29. A method of wireless communication at a first wireless communication device, comprising:

receiving, from a second wireless communication device, a discovery message that includes a service code;

verifying the service code; and transmitting, to the second wireless communication device, a connection message that includes protected user information and a protected service code, the protected service code being derived from the service code.

30. The method of claim 29, wherein the protected service code is derived from the service code by encrypting the service code.

31. The method of claim 30, wherein the protected service code is protected by one or more code-sending security parameters, a message indicator, or a combination thereof.

32. The method of claim 30, wherein the protected service code is protected by one or more code-receiving security parameters.

33. The method of claim 32, wherein verifying the service code comprises:

unscrambling the service code using a first code-receiving security parameter of the one or more code-receiving security parameters, wherein the first code-receiving security parameter is one of a discovery user confidentiality key (DUCK) or a discovery user scrambling key (DUSK);

determining whether the service code matches a discovery filter; and performing a message integrity check (MIC) based at least in part on a second code-receiving security parameter of the one or more code-receiving security parameters, wherein the second code-receiving security parameter is a discovery user integrity key (DUIK).

34. The method of claim 32, wherein the one or more code-receiving security parameters comprise a discovery user confidentiality key (DUCK), a discovery user scrambling key (DUSK), a discovery user integrity key (DUIK), or a combination thereof.

35. A method of wireless communication at a first wireless communication device, comprising:

transmitting, to a second wireless communication device, a discovery message that includes a service code;

receiving, from the second wireless communication device, a connection message that includes protected user information and a protected service code, the protected service code being derived from the service code; and setting up a connection with the second wireless communication device based at least in part on verifying the connection message.

36. The method of claim 35, wherein verifying the connection message includes verifying the connection message based at least in part on the protected service code.

37. The method of claim 36, wherein verifying the connection message includes verifying an integrity of the connection message further based at least in part on a code-sending security parameter of one or more code-sending security parameters, wherein the code-sending security parameter is a discovery user integrity key (DUIK).

38. The method of claim 37, wherein the one or more code-sending security parameters comprise a discovery user confidentiality key (DUCK), a discovery user scrambling key (DUSK), a DUIK, or a combination thereof.

39. The method of claim 35, wherein the first wireless communication device is a relay user equipment (UE), the second wireless communication device is a remote UE, and the discovery message is a PC5 discovery message.

40. A non-transitory computer-readable medium storing a set of instructions for wireless communication, the set of instructions comprising:

one or more instructions that, when executed by one or more processors of a first wireless communication device, cause the first wireless communication device to:

receive, from a second wireless communication device, a discovery message that includes a service code and user information;

verify the service code; and transmit, to the second wireless communication device, a connection message that includes a protected service code that is derived from the service code and protected user information that is derived from the user information.

41. The non-transitory computer-readable medium of claim 40, wherein the protected service code is derived from the service code by encryption of the service code.

42. The non-transitory computer-readable medium of claim 41, wherein the protected service code is protected using one or more code-receiving security parameters.

43. The non-transitory computer-readable medium of claim 42, wherein the one or more instructions, executable to cause the first wireless communication device to verify the service code, are further executable to cause the first wireless communication device to:

unscramble the service code using a first code-receiving security parameter of the one or more code-receiving security parameters, wherein the first code-receiving security parameter is one of a discovery user confidentiality key (DUCK) or a discovery user scrambling key (DUSK);

determine whether the service code matches a discovery filter; and perform a message integrity check (MIC) based at least in part on a second code-receiving security parameter of the one or more code-receiving security parameters, wherein the second code-receiving security parameter is a discovery user integrity key (DUIK).

44. The non-transitory computer-readable medium of claim 42, wherein the one or more code-receiving security parameters comprise a discovery user confidentiality key (DUCK), a discovery user scrambling key (DUSK), a discovery user integrity key (DUIK), or a combination thereof.

45. The non-transitory computer-readable medium of claim 40, wherein the protected service code is protected by one or more code-sending security parameters, a message indicator, or a combination thereof.

46. A non-transitory computer-readable medium storing a set of instructions for wireless communication, the set of instructions comprising:

one or more instructions that, when executed by one or more processors of a first wireless communication device, cause the first wireless communication device to:

transmit, to a second wireless communication device, a discovery message that includes a service code and user information;

receive, from the second wireless communication device, a connection message that includes a protected service code that is derived from the service code and protected user information that is derived from the user information; and set up a connection with the second wireless communication device based at least in part on verifying the connection message.

47. The non-transitory computer-readable medium of claim 46, wherein the one or more instructions, that cause the first wireless communication device to verify the connection message, cause the first wireless communication device to verify an integrity of the connection message further based at least in part on a code-receiving security parameter of one or more code-receiving security parameters, wherein the code-receiving security parameter is a discovery user integrity key (DUIK).

48. The non-transitory computer-readable medium of claim 46, wherein the first wireless communication device is a relay user equipment (UE), the second wireless communication device is a remote UE, and the discovery message is a PC5 discovery message.

49. The non-transitory computer-readable medium of claim 48, wherein the one or more instructions, executable to cause the first wireless communication device to verify the connection message, are further executable to cause the first wireless communication device to:

verify an integrity of the connection message further based at least in part on a code-sending security parameter of one or more code-sending security parameters, wherein the code-sending security parameter is a discovery user integrity key (DUIK).

50. The non-transitory computer-readable medium of claim 49, wherein the one or more code-sending security parameters comprise a discovery user confidentiality key (DUCK), a discovery user scrambling key (DUSK), the DUIK, or a combination thereof.

51. An apparatus for wireless communication, comprising:

means for receiving, from an other apparatus, a discovery message that includes a service code and user information;

means for verifying the service code; and means for transmitting, to the other apparatus, a connection message that includes a protected service code that is derived from the service code and protected user information that is derived from the user information.

52. The apparatus of claim 51, wherein the protected service code is derived from the service code by encryption of the service code.

53. The apparatus of claim 52, wherein the protected service code is protected using one or more code-receiving security parameters.

54. An apparatus for wireless communication, comprising:

means for transmitting, to an other apparatus, a discovery message that includes a service code and user information;

means for receiving, from the other apparatus, a connection message that includes a protected service code that is derived from the service code and protected user information that is derived from the user information; and means for setting up a connection with the other apparatus based at least in part on verifying the connection message.

55. The apparatus of claim 54, further comprising means for verifying an integrity of the connection message further based at least in part on a code-receiving security parameter of one or more code-receiving security parameters, wherein the code-receiving security parameter is a discovery user integrity key (DUIK).

* * * * *